(12) United States Patent
Timler et al.

(10) Patent No.: US 11,631,565 B2
(45) Date of Patent: Apr. 18, 2023

(54) THERMAL FUSE

(71) Applicant: Science Applications International Corporation, Reston, VA (US)

(72) Inventors: John P. Timler, River Ridge, LA (US); Xingcun C. Tong, Bolingbrook, IL (US)

(73) Assignee: Science Applications International Corporation, Reston, VA (US)

( * ) Notice: Subject to any disclaimer, the term of this patent is extended or adjusted under 35 U.S.C. 154(b) by 0 days.

(21) Appl. No.: 17/094,577

(22) Filed: Nov. 10, 2020

(65) Prior Publication Data

US 2022/0165529 A1 May 26, 2022

(51) Int. Cl.
| | |
|---|---|
| *H01H 85/055* | (2006.01) |
| *H01H 85/143* | (2006.01) |
| *H01H 85/02* | (2006.01) |
| *H01H 69/02* | (2006.01) |
| *H01H 85/44* | (2006.01) |
| *H01M 50/581* | (2021.01) |

(52) U.S. Cl.
CPC ...... *H01H 85/055* (2013.01); *H01H 85/0241* (2013.01); *H01H 85/143* (2013.01); *H01H 85/44* (2013.01); *H01M 50/581* (2021.01); *H01M 2200/103* (2013.01)

(58) Field of Classification Search
CPC .. H01H 85/055; H01H 69/02; H01H 85/0241; H01H 85/143; H01H 85/44; H01M 50/581; H01M 10/4235; H01M 10/425; H01M 2200/103
USPC ...................................................... 337/142
See application file for complete search history.

(56) References Cited

U.S. PATENT DOCUMENTS

| | | | | |
|---|---|---|---|---|
| 3,958,206 A | * | 5/1976 | Klint .................... | H01H 85/38 337/296 |
| 5,130,689 A | * | 7/1992 | Raykhtsaum ........ | H01H 37/761 337/296 |
| 5,793,275 A | * | 8/1998 | Iversen ................ | H01H 85/055 337/296 |
| 5,939,969 A | | 8/1999 | Doerrwaechter et al. | |
| 6,064,293 A | | 5/2000 | Jungst et al. | |
| 6,194,988 B1 | * | 2/2001 | Yamaguchi .......... | H01H 39/006 200/61.08 |

(Continued)

FOREIGN PATENT DOCUMENTS

| | | |
|---|---|---|
| CN | 106118216 A | 11/2016 |
| CN | 110240830 A | 9/2019 |
| WO | 02/14213 A2 | 2/2002 |

OTHER PUBLICATIONS

Xie, Zhixiong, et al., "Enhanced Hydrogen Generation Properties of Al—Ga13 In—Sn Alloy in Reaction with Water by Trace Amount of AlTi5B Additivies," downloaded Oct. 20, 2020 from <https://pdfs.semanticscholar.org/768b/1bdd0d33cc8e9ea0e2af6e3c3031ecdb01db.pdf?_ga=2.229568857.431441619.1599169590-562954880.1580147990>, Materals Transactions, vol. 58, No. 5 (2017), pp. 724-727.

(Continued)

*Primary Examiner* — Anatoly Vortman

(74) *Attorney, Agent, or Firm* — Banner & Witcoff, Ltd.

(57) ABSTRACT

A thermal fuse may comprise an electrode and a conductor separated by a phase change material. The electrode may be formed from a conductive material that generates hydrogen when exposed to water or hydrogen peroxide. The phase change material may release water or hydrogen peroxide at or above an activation temperature.

16 Claims, 10 Drawing Sheets

(56) References Cited

U.S. PATENT DOCUMENTS

| | | | | |
|---|---|---|---|---|
| 6,348,851 | B1* | 2/2002 | Wyser | H01H 37/761 337/411 |
| 6,445,276 | B2* | 9/2002 | Schon | H01H 85/46 361/87 |
| 6,556,119 | B1* | 4/2003 | Lell | H01H 37/323 337/182 |
| 6,582,676 | B2 | 6/2003 | Chaklader | |
| 7,498,923 | B2* | 3/2009 | Iversen | H01H 39/006 337/296 |
| 7,566,360 | B2 | 7/2009 | Garbar et al. | |
| 7,938,879 | B2 | 5/2011 | Woodall et al. | |
| 8,012,676 | B2 | 9/2011 | Yoshiki et al. | |
| 8,080,233 | B2 | 12/2011 | Woodall et al. | |
| 8,994,489 | B2* | 3/2015 | Redaelli | H01H 85/11 337/296 |
| 10,184,075 | B2 | 1/2019 | Bissell et al. | |
| 10,492,297 | B2 | 11/2019 | Chopra et al. | |
| 2002/0113685 | A1 | 8/2002 | Izaki et al. | |
| 2011/0050384 | A1* | 3/2011 | Chen | H01H 37/761 337/296 |
| 2011/0068889 | A1 | 3/2011 | Senda et al. | |
| 2012/0052001 | A1 | 3/2012 | Woodall et al. | |
| 2012/0112788 | A1* | 5/2012 | Lung | G11C 13/0004 326/39 |
| 2012/0168684 | A1 | 7/2012 | Magdassi et al. | |
| 2013/0195729 | A1 | 8/2013 | Woodall et al. | |
| 2017/0117235 | A1* | 4/2017 | Borenstein | H01L 23/573 |
| 2020/0221580 | A1 | 7/2020 | Tavakoli et al. | |
| 2022/0165529 | A1* | 5/2022 | Timler | H01M 10/425 |
| 2022/0306887 | A1 | 9/2022 | Timler et al. | |

OTHER PUBLICATIONS

Wang, Hong-Wen, et al., "Generation of hydrogen from aluminum and water—Effect of metal oxide nanocrystals and water quality," downloaded Oct. 20, 2020 from <https://depts.washington.edu/solgel/documents/pub_docs/journal_docs/2011/11-IntJHydro-HW%20Wang.pdf>, International Journal of Hydrogen Energy 36 (2011) 15136-15144.

Hirschey, Jason, et al., "Review of Inorganic Salt Hydrates with Phase Change Temperature in Range of 5° C to 60° C and Material Cost Comparison with Common Waxes," 5th International High Performance Buildings Converence at Purdue, Jul. 9-12, 2018, 3653, pp. 1-10.

Petrovic, John, et al., U.S. Department of Energy, "Reaction of Aluminum with Water to Produce Hydrogen," downloaded Oct. 20, 2020 from <https://www.energy.gov/sites/prod/files/2014/03/f9/aluminum_water_hydrogen.pdf>, 27 pages.

Ziebarth, Jeffrey T., et al., "Liquid phase-enabled reaction of Al—Ga and Al—Ga—In—Sn alloys with water," International Journal of Hydrogen Energy 36 (2011) 5271-5279, downloaded Oct. 20, 2020 from <https://woodall.ece.ucdavis.edu/wp-content/uploads/sites/84/2016/02/ziebarth2011.pdf>.

Zhang, Fan, et al., "Hydrolytic Hydrogen Production on Al—Sn—Zn Alloys Processed by High-Pressure Torsion," downloaded Oct. 20, 2020 from <https://www.ncbi.nlm.nih.gov/pmc/articles/PMC6073298/pdf/materials-11-01209.pdf>, Materials 2018, 11, 1209; pp. 1-18.

"New process generates hydrogen from aluminum alloy to run engines, fuel cells," Purdue University News, May 15, 2007, downloaded Sep. 3, 2020, 5 pages, downloaded from <https://www.purdue.edu/uns/x/2007a/070515WoodallHydrogen.html>.

Iqbal, Kashif, et al., "Phase change materials, their synthesis and application in textiles—a review," The Journal of The Textile Institute, vol. 110, No. 4, 625-638, Jan. 8, 2019.

Saito, Nagahiro, et al., "Solution plasma: A new reaction field for nanomaterials synthesis," Japanese Journal of Applied Physics, 2018, 57, 0102A4, 11 pages.

Uda, Masahiro, et al., "Hydrogen generation from water using Mg nanopowder produced by arc plasma method," Sci. Technol. Adv. Mater. 13 (2012) 025009, 2012, 7 pages.

Takai, Osamu, "Fundamentals and Applications of Solution Plasma," Journal of Photopolymer Science and Technology, vol. 27, No. 3 (2014) 379-384, 2014.

Lee, J., Kim, J.,Park, J. & Lee, C. (2018) Characterization of in situ silver nanoparticles sintering on commercial photo papers in inkjet printing. Flex. Print. Electronics 3.

Magdassi, Shlomo, Grouchko, Michael, Berezin, Oleg, and Kamyshny, Alexander, "Triggering the sintering of silver nanoparticles at room temperature" and Supporting Information, ACS Nano 4, 4, pp. 1943-1948, DOI:10.1021.nn901868t.

Shen, Wenfeng, Zhang, Xianpeng, Huang, Qijin, Xu, Qingsong, and Song, Weijie, "Preparation of solid silver Tanoparticles for inkjet printed flexible electronics with high conductivity," Nanoscale 6 (2014), pp. 1622-1628.

Allen, Mark, Leppaniemi, Jaakko, Vilkman, Marja, Alastalo, Ari, and Mattila, Tomi, "Substrate-facilitated Tanoparticle sintering and component interconnection procedure," Nanotechnology 21 (2010) 475204, 6 pages, DOI: 10.1088/0957-4484/21/47/475204.

Groucho, Michael, Kamyshny, Alexander, Mihailescu, Cristina Fiorentina, Anghel, Dan Florin and MAGDASSI, Schlomo, "Conductive Inks with a "Built-In" Mechanism That Enables Sintering at Room Temperature," American Chemical Society Nano, vol. 5, No. 4, (2011), pp. 3354-3359.

Peng, Peng, Li, Lihang, Guo, Wei, Hui, Zhuang, Fu, Jian, Jin, Chao, Liu, Yangai, and Zhu, Ying, "Room-temperature joining of silver nanoparticles using potassium chloride solution for flexivel electrode application," J. Phys. Chem. C 2018, 122(5), pp. 2704-2711, DOI: 10.1021/acs.jpcc.7b10601.

Bourassa, Justin, Ramm, Alex, Feng, James Q., Renn, Michael J., "Water vapor-asissted sintering of silver Tanoparticle inks for printed electronics", SN Applied Sciences (2019) 1:517, https://doi.org/10.1007/42452-019-0542-0, 6 pages.

Hu, Donghao, Ogawa, Kazuyoshi, Kajiyama, Mikio, "Characterization of self-assembled silver nanoparticle ink based on nanoemulsion method", R Soc Open Sci. May 2, 20207;7(5):200296, 14 pages.

Mo, Lixin, Guo, Zhenxin, Yang, Li, et al., "Silver Nanoparticles Based Ink with Moderate Sintering in Flexible and Printed Electronics," Int. J. Mol. Sci. 2019, 20, 2124; doi:10.3390/ijms20092124, 28 pages.

Mo, Lixin, Guo, Zhenxin, Wang, Zhenguo, et al., "Nano-Silver Ink of High Conductivity and Low Sintering Temperature for Paper Electronics," Nanoscale Research Letters (2019) 14:197, 11 pages.

Amendola, S., Palombi, A. and Marrocco, G., "Inkjet Printing of Epidermal RFID Anetennas by Self-Sintering Conductive Ink", IEEE Transactions on Microwave Theory and Techniques, vol. 66, No. 3, Mar. 2018, pp. 1561-1569.

Grasso, Salvatore, Biesuz, Mattia, Zoli, Luca, Taveri, Gianmarco, Duf, Andrew I., Ke, Daoyao, Jiang, Anna, and Reece, Michael J., "A review of cold sintering processes," Advances in Applied Ceramics, vol. 119, No. 3, (2020), pp. 115-143, DOI: 10.1080/17436753.2019.1706825.

Boley, J. William, White, Edward L Chiu, George T.-C. and Kramer, Rebecca K., "Direct Writing of Gallium-ndium Alloy for Stretchable Electronics," Advanced Functional Materials, vol. 24, (2014), pp. 3501-3507.

Wang, Dawei, et al., "Cold sintering of microwave dielectric ceramics and devices," Journal of Materials Research, vol. 36, Issue 2, (Jan. 2021), pp. 333-349.

Wang, Binghao, et al., "High-k Gate Dielectrics for Emerging Flexible and Stretchable Electronics", Chem. Rev., vol. 118 (2018), pp. 5690-5754.

Yogeswaran, N., et al. "New materials and advances in making electronic skin for interactive robots," 2015 Advanced Robotics, 29:21, 1359-1373, DOI: 10.1080/01691864.2015.1095653.

Zhou, Hongyang, et al., "Review of flash sintering with strong electric field", High Voltage, 2021, pp. 1-11, DOI: 10.1049/hve2.12080.

Peng, Rui, et al., "The sintering and dielectric properties modification of Li2MgSi04 ceramic with Ni2+-ion doping based on calculation and experiment," Journal of Materials Research and Technology 2020; 9(2), pp. 1344-1356, DOI: 10.1016/j.jmrt.2019.11.061.

(56) References Cited

OTHER PUBLICATIONS

Yuen, Michelle, et al., "Self-sintering liquid metal colloidal inks for facile manufacture of stretchable conductors," 2020 3rd IEEE International Conference on Soft Robotics (RoboSoft), Yale University, pp. 676-681.
Wang, Binghao, et al., "High-k Gate Dielectrics for Emerging Flexible and Stretchable Electronics," Chemical Reviews, Dhem. Rev. 2018, 118, 5690-5754, downloaded May 21, 2021, <<https://pubs.acs.org/sharingguidelinesforoptions on howto legitamtely share published articles>>.
Liu, J., Kumar, P., Dutta, I., Raj, R., Sidhu, R., Renavikar, M., and Mahajan, R., "Liquid phase sintered Cu-In composite solders for thermal interface material and interconnect applications", J Mater Sci (2011) vol. 46, pp. 7012-7025.
Lewis, Jacob S., Perrier, Timothy, Barani, Zahra, Kargar, Fariborz, and Balandin, Alexander A., "Thermal nterface materials with graphene fillers: review of the state of the art and outlook for future applications", Nanotechnology vol. 32 (2021), 30 pages.
Tong, Xingcun Colin, Advanced Materials for Thermal Management of Electronic Packaging, Springer Science +Business Media LLLC, 2011.
U.S. Appl. No. 17/402,324, filed Aug. 13, 2021, titled "Sinterable Compounds Comprising Dielectric Material, Articles Formed from Such Compounds, and Methods of Forming Such Compounds and Articles".
Nov. 24, 2022 (WO) International Search Report and Written Opinion—App. No. PCT/US2022/019792.

\* cited by examiner $T \geq T_{act}$

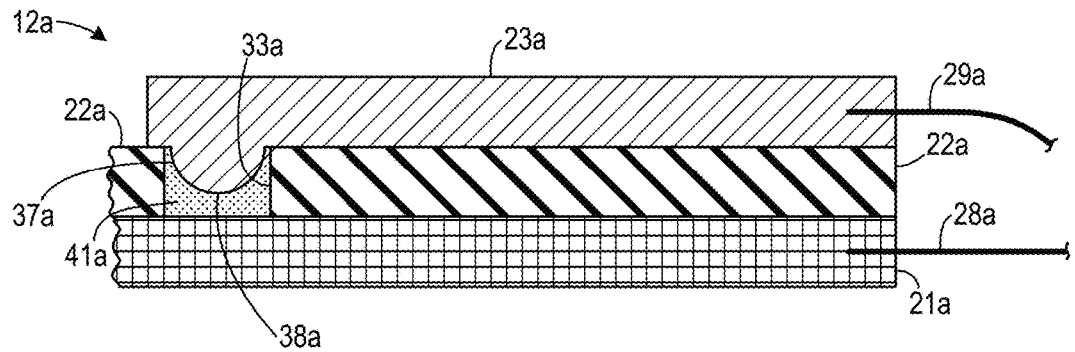
FIG. 5A
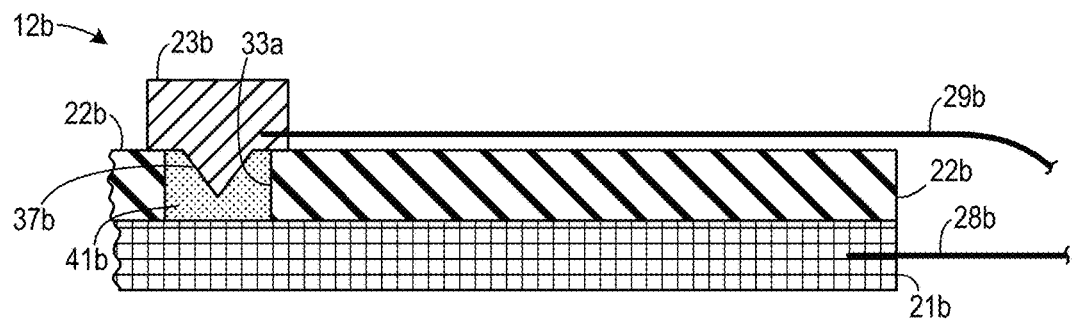
FIG. 5B
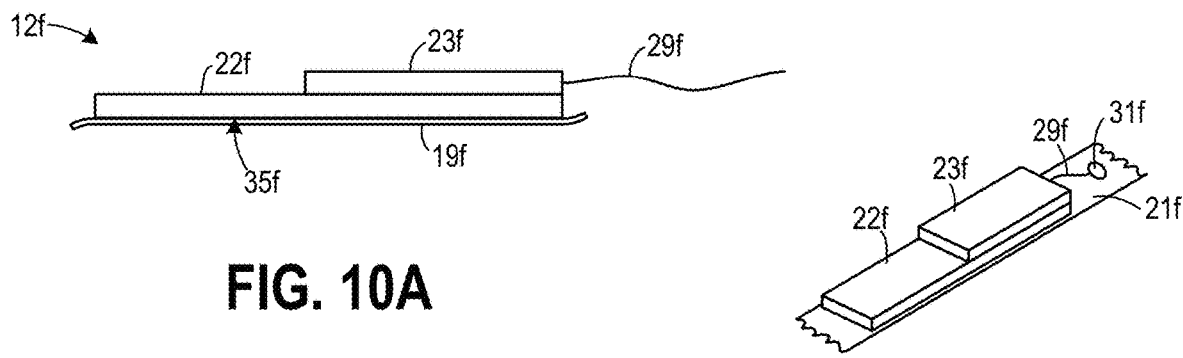
FIG. 10A
FIG. 10C
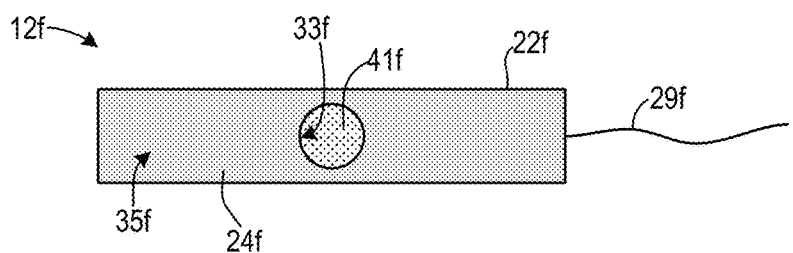
FIG. 10B

THERMAL FUSE

GOVERNMENT LICENSE RIGHTS

This invention was made with Government support under Contract No. N00178-04-D-4119-FC46 awarded by the United States Navy. The Government has certain rights in this invention.

BACKGROUND

A thermal fuse may be used to protect a system from damage that may occur because of operation at excessive temperatures. For example, large format lithium battery arrays may use thermal fuses to protect against operation at temperatures that may lead to thermal runaway. However, known thermal fuses may current-limit a system, may introduce parasitic resistance losses, and/or may have other disadvantages.

SUMMARY

This Summary is provided to introduce a selection of some concepts in a simplified form as a prelude to the Detailed Description. This Summary is not intended to identify key or essential features.

A thermal fuse may comprise an electrode formed from a conductive material that generates hydrogen when exposed to water or hydrogen peroxide, as well as a separate conductor. A phase change material, which may be solid below an activation temperature and which may release water or hydrogen peroxide at or above the activation temperature, may separate the conductor and the electrode. When used in a circuit below an activation temperature, current may flow through the conductor without flowing through the electrode. When the activation temperature of the phase change material is reached, water and/or hydrogen peroxide may be released and may react with the electrode material to release gaseous hydrogen. The gaseous hydrogen, in the presence of a voltage across the electrode and the conductor, may create an electrochemical discharge plasma reaction. An arc associated with this plasma reaction may then burn and/or melt the conductor and sever an electrical connection.

These and other features are described in more detail below.

BRIEF DESCRIPTION OF THE DRAWINGS

Some features are shown by way of example, and not by way of limitation, in the figures of the accompanying drawings and in which like reference numerals refer to similar elements.

FIGS. 5A and 5B are partially schematic area cross-sectional views, from locations similar to that indicated in FIG. 2 for FIG. 3, of additional thermal fuses.

FIG. 10A is a side view of an additional thermal fuse.

FIG. 10B is a bottom view of the thermal fuse of FIG. 10A.

FIG. 10C is a perspective view of the thermal fuse of FIG. 10A installed on a conductor.

DETAILED DESCRIPTION

Figure 1:
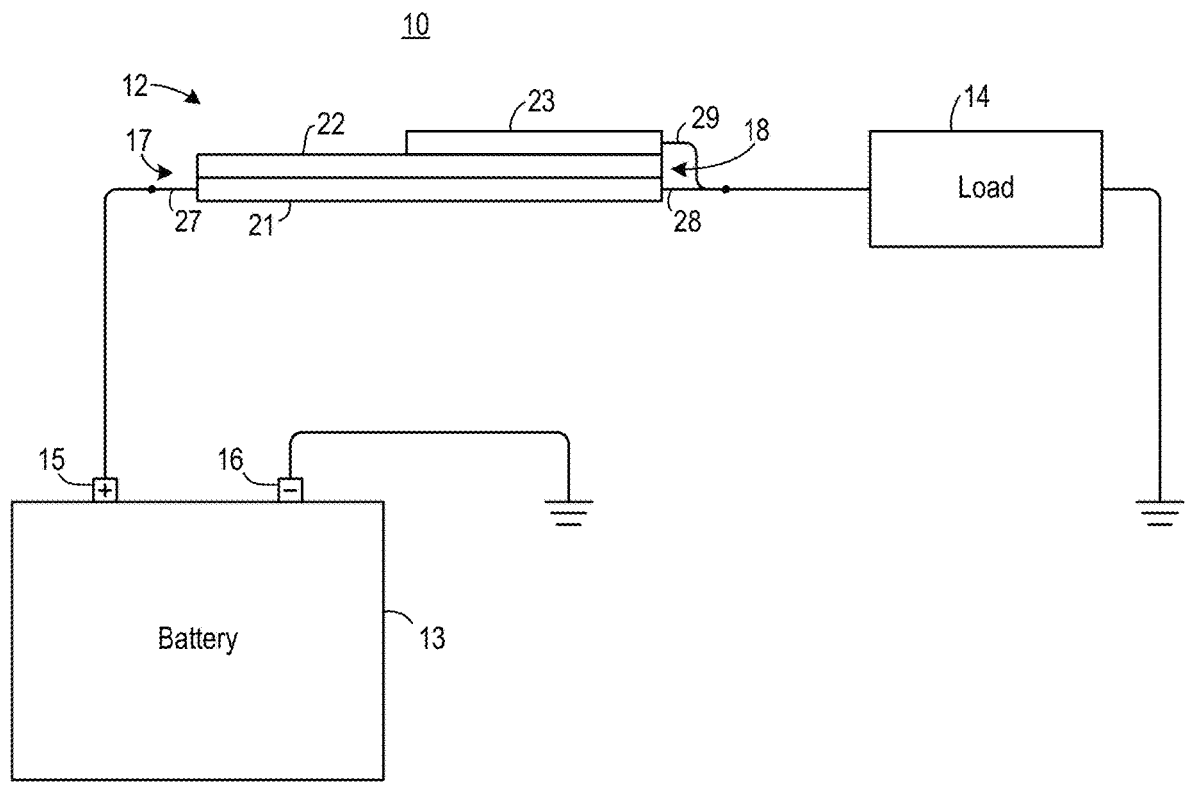
FIG. 1 is a partially schematic diagram of a circuit that comprises a thermal fuse.

FIG. 1 is a partially schematic diagram of a circuit 10 that comprises a thermal fuse 12. The circuit 10 may comprise a power source such as a battery 13 and an electrical load 14. The electrical load 14 may comprise a motor (or other mechanical actuator), an illumination and/or heating device, an electronic device (e.g., a computer, a radio or other communication device), and/or any other type of device that consumes electrical power. A conductor 21 of the thermal fuse 12 may be part of an electrical path between the battery 10 and the electrical load 14. The circuit 10 may comprise switches, additional loads, additional batteries, additional thermal or other fuses, and/or additional elements.

In the example of FIG. 1, a first side 17 of the thermal fuse 12 is electrically connected to a positive side of the circuit 10 (e.g., to the positive terminal 15 of the battery 13), a second side 18 of the thermal fuse 12 is electrically connected to a negative side of the circuit 10 (e.g., to the first side of the electrical load 14), and a negative terminal 16 of the battery 13 and a second side of the electrical load 14 are connected to ground. The thermal fuse 12 may alternatively be located between the second side of the electrical load 14 and ground, and/or the sides 17 and 18 of the thermal fuse 12 may alternately be connected to respective negative and positive sides of the circuit 10.

The thermal fuse 12 may comprise the conductor 21, an insulator 22, and an electrode 23. The thermal fuse 12 may comprise a first lead 27, a second lead 28, and a third lead 29. The first lead 27, connected to a first end of the conductor 21, may be used to connect the first side 17 of the thermal fuse 12 to a first side of a circuit. The second lead 28, connected to a second end of the conductor 21, and the third lead 29, connected to the electrode 23, may be used to connect the second side 18 of the thermal fuse to a second side of the circuit. Prior to activation of the thermal fuse 12, current (e.g., direct current) may pass, via the conductor 21, between the first lead 27 and the second lead 28. However, current may be blocked from passing through the electrode 23 and the third lead 29 prior to activation of the thermal fuse 12. After the thermal fuse 12 is activated, and as described below, current may briefly flow via the electrode 23 so as to create a plasma that severs the conductor 21.

Figure 2:
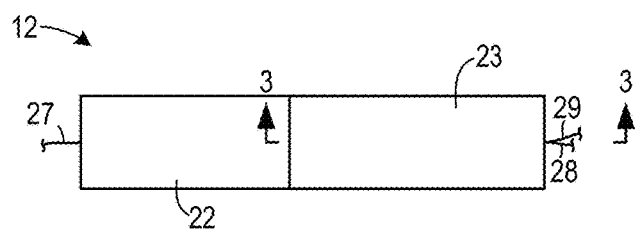
FIG. 2 is a top view of the thermal fuse of FIG. 1.

FIG. 2 is a top view of the thermal fuse 12. In FIG. 2, the conductor 21 is obscured, but a top side of the electrode 23 and a portion of the top side of the insulator 22 are visible. In the example of FIGS. 1 and 2, the conductor 21 and the insulator 22 may comprise planar rectangular layers. Except for a protrusion of the electrode 23 extending into a cavity of the insulator 22, which protrusion and cavity are not visible in FIGS. 1 and 2, the electrode 23 may also comprise a planar rectangular layer.

The conductor 21 may, for example, comprise a film, sheet, or other section of a conductive material. Examples of conductive materials that may be used include, without limitation: nickel (Ni); a veil or mat coated with copper (Cu), Ni, and/or one or more other metals; a polymer mesh, fabric, and/or textile coated with Cu, Ni, and/or one or more other metals; and/or a foil of Cu, Ni, Al, silver (Ag), tin (Sn), and/or one or more other metals, which foils may be optionally coated with a noble metal (e.g., ruthenium (Ru), rhodium (Rh), palladium (Pd), Ag, osmium (Os), iridium (Ir), platinum (Pt), and/or gold (Au)). Although example dimensions for the conductor 21 comprise a length between 5 millimeters (mm) and 30 mm, a width between 1 mm and 15 mm, and a thickness of between 0.1 mm and 5 mm, the conductor 21 may have a length, width, and/or thickness that is outside of any of those ranges.

The insulator 22 may, for example, comprise a film, sheet, or other section of an insulating material such as polyvinyl chloride (PVC), polyethylene (PE), polyimide, Teflon, silicone, other thermoplastic or thermoset polymer, paper, mica, and/or other electrically insulating materials. Although example dimensions for the insulator 22 comprise a length between 5 millimeters (mm) and 30 mm, a width between 1 mm and 15 mm, and a thickness of between 0.1 mm and 1 mm, the insulator 22 may have a length, width, and/or thickness that is outside of any of those ranges.

Figure 3:
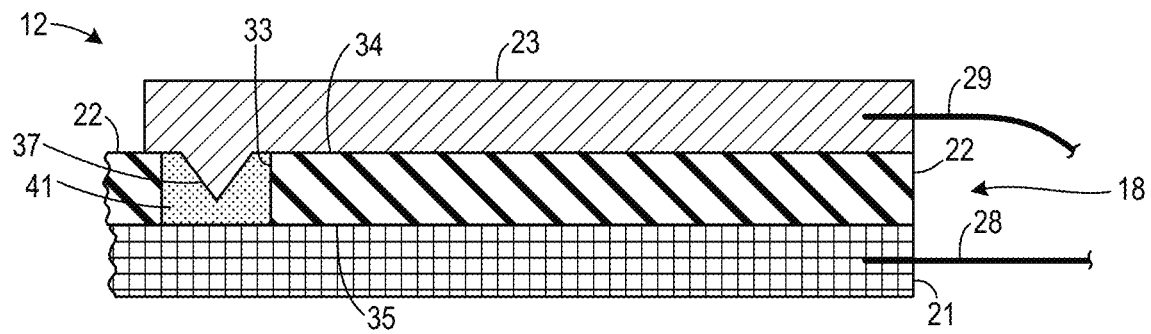
FIG. 3 is an enlarged, partially schematic area cross-sectional view taken from the location indicated in FIG. 2.
Figure 4A:
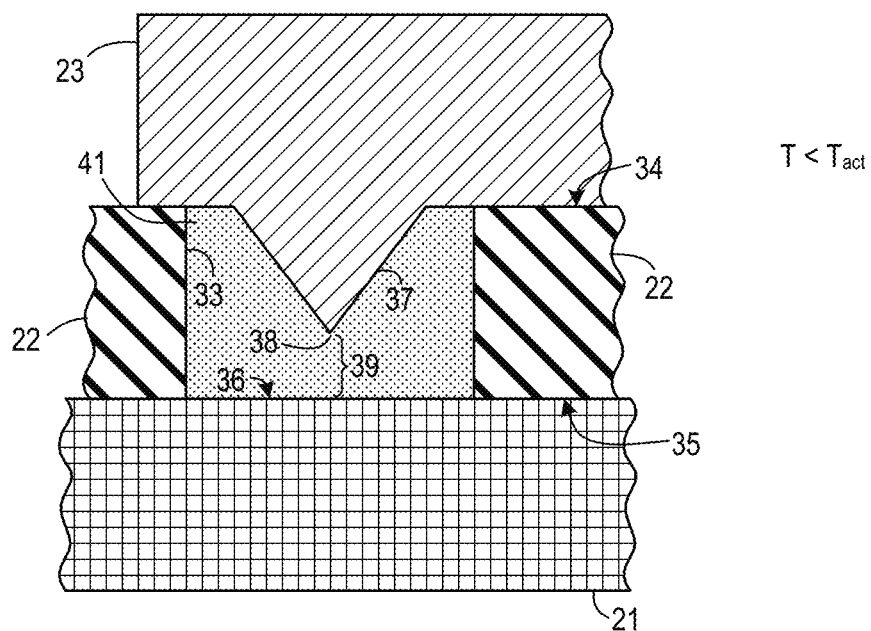
FIG. 4A is a further enlarged view of a portion of the area cross-sectional view of FIG. 3.

FIG. 3 is an enlarged, partially schematic area cross-sectional view, taken from the location indicated in FIG. 2, of a portion of the thermal fuse 12. FIG. 4A is a further enlarged portion of the left side of the area cross-sectional view of FIG. 3. A portion of second lead 28 may be embedded in or otherwise conductively attached to the second end of the conductor 21. Although not visible in FIG. 3, a portion of the first lead 27 may similarly be embedded in or otherwise conductively attached to the first end of the conductor 21. A portion of the third lead 29 may be embedded in or otherwise conductively attached to the electrode 23.

The electrode 23 may be in contact with, and/or may be bonded (e.g., by an adhesive) or otherwise secured to, a first side 34 of the insulator 22. The conductor 21 may be in contact with, and/or may be bonded (e.g., by an adhesive) or otherwise secured to, a second side 35 of the insulator 22. The insulator 22 may comprise a cavity 33 extending from the first side 34 of the insulator 22 to the second side 35 of the insulator 22. The cavity 33 may, for example, comprise a cylindrical hole (e.g., a hole with a diameter of 1 mm to 12 mm). The cavity 33 may expose a portion of a first side 36 of the conductor 21. The electrode 23 may comprise a protrusion 37 that extends through a plane of the first side 34 and into the cavity 33. The protrusion 37 may have a conical shape that terminates in an end 38 that is separated by a gap 39 from the first side 36 of the conductor 21.

The gap 33 may further contain an activation block 41. The block 41, which may fill the volume of the cavity 33 not filled by the protrusion 37, may be formed from a phase change material (PCM) that is solid when the temperature of that PCM is below an activation temperature. At or above the activation temperature, the PCM may become partially liquid and/or may release water and/or hydrogen peroxide. The PCM may be selected so that the activation temperature is a desired value. Examples of PCMs are described below.

The electrode 23 may comprise a gallium-aluminum (Ga—Al) alloy and/or another material that is electrically conductive and that causes generation of hydrogen when exposed to water and/or hydrogen peroxide. Examples of Ga—Al alloys and other materials that may be used for the electrode 23 are described below. Although example dimensions for the electrode 23 comprise a length between 5 millimeters (mm) and 20 mm, a width between 1 mm and 15 mm, and a thickness of between 0.1 mm and 5 mm, the insulator 22 may have a length, width, and/or thickness that is outside of any of those ranges. In FIG. 4A, the temperature T is below the activation temperature $T_{act}$ of the PCM of the block 41. When the thermal fuse 12 is in the circuit 10 and $T<T_{act}$, the block 41 may remain solid. Although there may be a voltage across the gap 39 while circuit current flows through the conductor 21, in one embodiment current does not flow across the gap 39 or through the electrode 23 before activation.

Figure 4B:
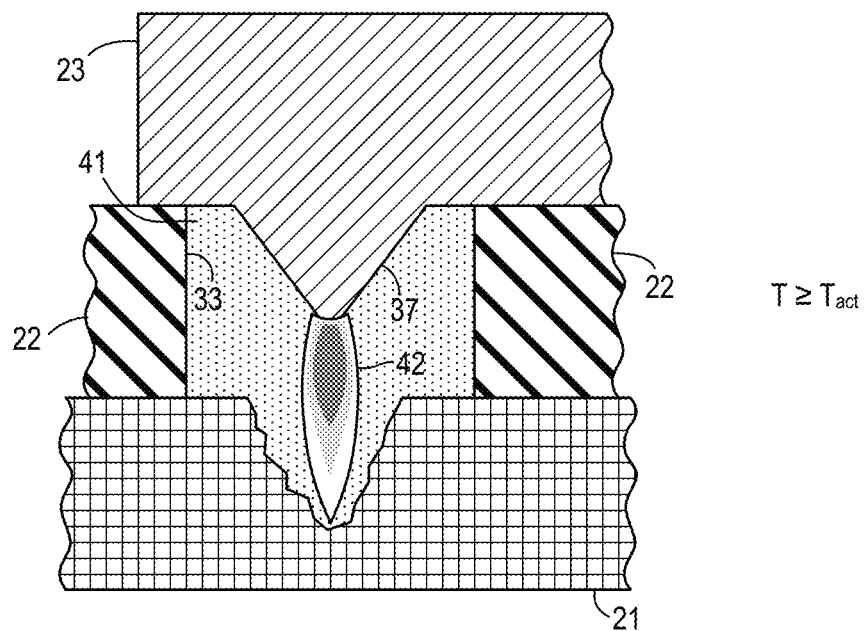
FIG. 4B is an enlarged view, similar that of FIG. 4A, showing the thermal fuse of FIGS. 1 and 2 after activation.
Figure 4C:
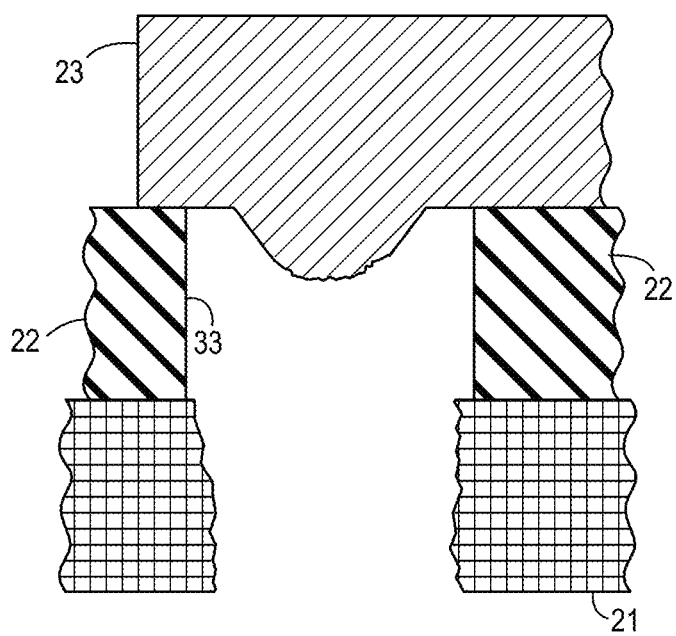
FIG. 4C is an enlarged view, similar that of FIG. 4A, showing the thermal fuse of FIGS. 1 and 2 after use.

FIG. 4B is an enlarged area cross-sectional view showing, after activation, the same portion of the thermal fuse 12 shown in FIG. 4A. In FIG. 4B, the temperature T equals or exceeds $T_{act}$ ($T \geq T_{act}$). The PCM of the block 41 has become at least partially liquid and releases water and/or hydrogen peroxide. The released water contacts the material of the protrusion 37, which initiates an exothermic chemical process that causes gaseous hydrogen to be released. This release of gaseous hydrogen in the presence of the voltage across the gap 39 triggers an electrochemical discharge plasma arc 42. The high temperature plasma arc 42 melts, vaporizes, and/or burns through the conductor 21. This severs the conductor 21, as shown in FIG. 4C (an enlarged area cross-sectional view showing the same portion of the thermal fuse 12 shown in FIGS. 4A and 4B). However, the plasma arc 42 may be very short-lived and may break down quickly (e.g., on the order of a microsecond). This time is sufficient to sever the conductor 21, but may be brief enough to reduce the potential for damage to other components. After the conductor 21 is severed, current no longer flows through the thermal fuse 12.

An example size of the gap 39 may comprise 1 micrometer (μm) to 1000 μm. The size of the gap 39 may be determined based on the expected voltage across the gap 39 and the amount of hydrogen expected to be produced in the cavity 33. The expected voltage may be determined based on the circuit for which a particular thermal fuse is being designed. The expected amount of hydrogen may be determined based on PCM chosen for the block 41 and the Ga—Al alloy (and/or other material) chosen for the electrode 23. In addition, the formed hydrogen bubbles may accelerate the plasma reaction, and make it possible to melt or vaporize the conductor material within a nanosecond to a microsecond.

As can be appreciated from the above, the electrode 23 and the interface between the protrusion 37 and the conductor 21 are not part of the circuit 10 prior to activation of the thermal fuse 12. This allows the thermal fuse 12, when used in a circuit such as the circuit 10, to partially or completely avoid parasitic resistance losses associated with other types of thermal fuses. Moreover, some or all of the structure of the thermal fuse 12 may be formed using a 3D printing process.

FIG. 5A is an area cross-sectional view of a thermal fuse 12a taken from a location similar to that indicated in FIG. 2 for FIG. 3. The thermal fuse 12a may be used in ways that are the same as or similar to ways in which the thermal fuse 12 may be used, and may operate in ways that are the same as or similar to the ways in which the thermal fuse 12 may operate. The thermal fuse 12a may comprise a conductor 21a, an insulator 22a, leads 28a and 29a, and a cavity 33a that may be the same as or similar to the conductor 21, the insulator 22, the leads 28 and 29, and the cavity 33 of the thermal fuse 12. The thermal fuse 12a may also include a lead that is the same as or similar to the lead 27 of the thermal fuse 12. An electrode 23a of the thermal fuse 12a may also be similar to the electrode 23 of the thermal fuse 12, but may comprise a protrusion 37a having shape different from that of the protrusion 37. For example, the protrusion 37a may have a hemispherical or otherwise domed shape. However, an end 38a of the protrusion 37a is separated from the conductor 21a. A block 41a of the thermal fuse 12a may be similar to the block 41 of the thermal use 41, e.g., the block 41a may be formed from a PCM that is the same as or similar to the PCM of the block 41, and the block 41a may fill the volume of the cavity 33a not filled by the protrusion 37a.

FIG. 5B is an area cross-sectional view of a thermal fuse 12b taken from a location similar to that indicated in FIG. 2 for FIG. 3. The thermal fuse 12b may be used in ways that are the same as or similar to ways in which the thermal fuse 12 may be used, and may operate in ways that are the same as or similar to the ways in which the thermal fuse 12 may operate. The thermal fuse 12b may comprise a conductor 21b, an insulator 22b, leads 28b and 29b, and a cavity 33b that may be the same as or similar to the conductor 21, the insulator 22, the leads 28 and 29, and the cavity 33 of the thermal fuse 12. The thermal fuse 12a may similarly include a lead that is the same as or similar to the lead 27 of the thermal fuse 12. An electrode 23b of the thermal fuse 12b does not extend to the end of the fuse 12b. Instead, the electrode 12b is confined to a smaller region above the cavity 33b. However, a protrusion of the electrode 23b may have a shape similar to that of the protrusion 37 (as shown in FIG. 5B), a shape similar to that of the protrusion 37a, or another shape. A block 41b of the thermal fuse 12b may be similar to the block 41 of the thermal fuse 12, e.g., the block 41b may be formed from a PCM that is the same as or similar to the PCM of the block 41, and the block 41b may fill the volume of the cavity 33b not filled by the protrusion 37b.

The thickness of the conductor 21 may limit the amount of current that may be carried by the thermal fuse 12 prior to activation. Increasing that thickness to carry higher currents may, in some cases, be impractical. For example, an amount of PCM needed to create an electrochemical discharge plasma strong enough to melt through a larger conductor may be difficult to contain in a package that will fit in available space. However, a thermal fuse similar to those described above may be combined with additional components to operate on larger conductors.

Figure 6A:
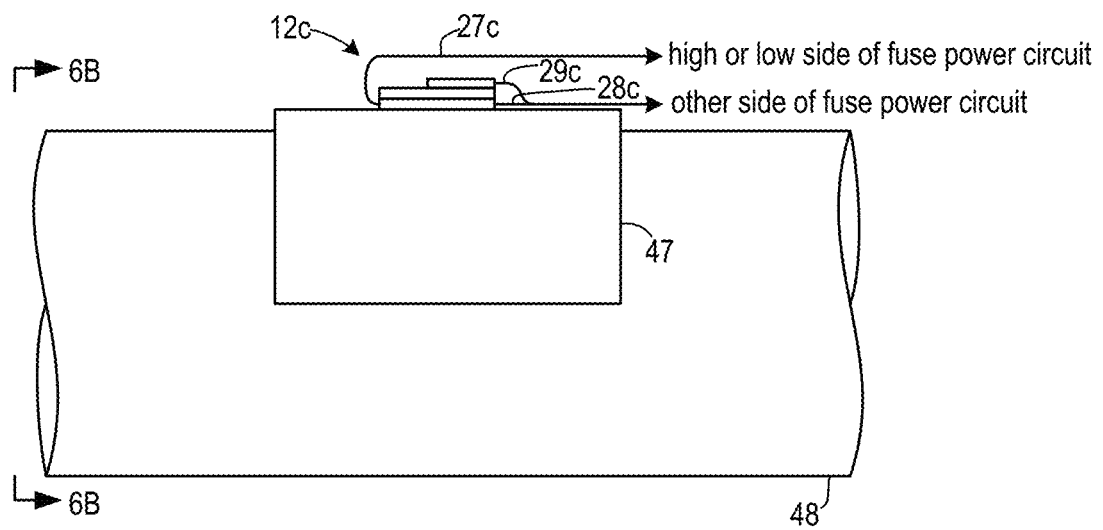
FIG. 6A shows another thermal fuse as installed on a conductor.

FIG. 6A is a partially schematic side view of an example of such a combination. In FIG. 6A, a thermal fuse 12c is positioned on a conductor-severing charge 47. The charge 47 may comprise a thermite that, once ignited, burns at a temperature high enough to melt and/or burn through copper and/or other materials(s) that might be used to form a conductor 48. A first lead 27c of the thermal fuse 12c may be connected to a one of a high side or a low side of a separate fuse power circuit, and a second lead 28c and a third lead 29c of the thermal fuse 12c may be connected the other of the high side or the low side of that separate fuse power circuit.

Figure 6B:
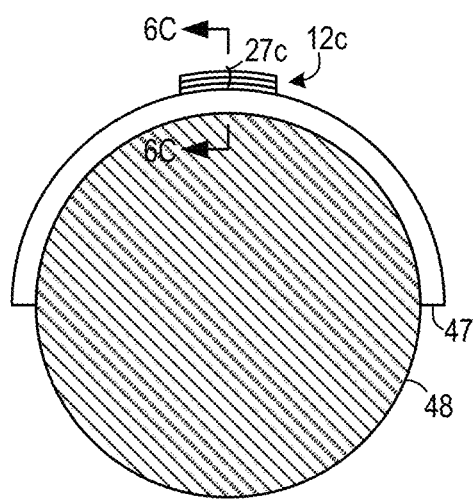
FIG. 6B is a partially schematic area cross-sectional view taken from the location indicated in FIG. 6A.

FIG. 6B is a partially schematic area cross-sectional view, taken from the location indicated in FIG. 6A, showing the fuse 12c, the charge 47, and the conductor 48. The conductor 48 may further comprise an insulation jacket, not shown. The charge 47 may comprise a thermite encapsulated in a thin plastic film or other packaging that allows the charge 47 to be wrapped partially or completely around the conductor 48. A surface of the charge 47 in contact with an outer surface of the conductor 48 (or with an outer surface of an insulating jacket of the conductor 48) may comprise an adhesive to hold the charge 47 in place. Also or alternatively, straps may be used to secure the charge 47 in place.

Figure 6C:
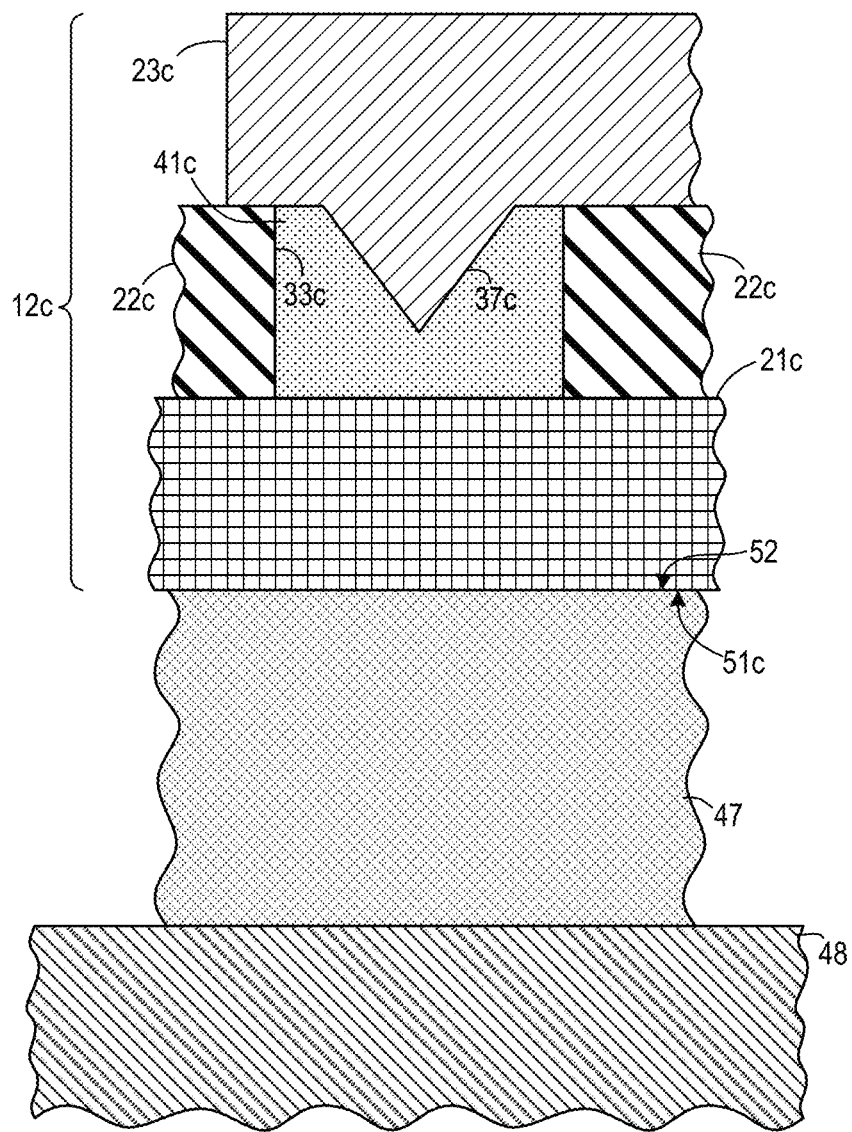
FIG. 6C is an enlarged, partially schematic, area cross-sectional view taken from the location indicated in FIG. 6B.

FIG. 6C is an enlarged, partially schematic, area cross-sectional view taken from the location indicated in FIG. 6B. As shown in FIG. 6C, the thermal fuse 12c may be the same as or similar to the thermal fuse 12. The thermal fuse 12c may comprise a conductor 21c, an insulator 22c, an electrode 23c, a cavity 33c, a protrusion 37c, and a block 41c that may be the same as or similar to the conductor 21, the insulator 22, the electrode 23, the cavity 33, the protrusion 37, and the block 41 of the thermal fuse 12. The leads 27c, 28c, and 29c of the thermal fuse 12c may be the same as or similar to the leads 27, 28, and 29 of the thermal fuse 12. A surface 51c of the conductor 21c may comprise an adhesive to attach the thermal fuse 12c to a surface 52 of the charge 47.

In operation, the thermal fuse 12c may receive power from the fuse power circuit, which may be a low power circuit separate from a circuit for which the conductor 47 may be carrying alternating or direct current. If the temperature T of the block 41c reaches or exceeds the activation temperature $T_{act}$, the thermal fuse 12c may activate in a manner that is the same or similar to that described above in connection with the thermal fuse 12. The resulting electrochemical plasma arc may burn through the conductor 22c and ignite the charge 47. After ignition, the charge 47 may burn through and/or melt the conductor 48, therefore causing interruption of a circuit that comprises the conductor 48.

The example thermal fuses described above may be used as safety devices to protect a battery and/or other types of equipment from being damaged because of operation at excessive temperatures. For example, a PCM (e.g., for any of the blocks 41, 41a, 41b, or 41c) may be selected so that the activation temperature $T_{act}$ corresponds to a maximum safe operating temperature for one or more components of a system that comprises the thermal fuse. If a temperature T in that system exceeds that $T_{act}$, the thermal fuse may be activated to shut down the system and prevent damage. Similar thermal fuses may be used as a triggering device (e.g., for an explosive, a propellant, etc.) and configured to reach an activation temperature $T_{act}$ on command, for example, independent of an ambient temperature of an environment in which the thermal fuse is located.

Figure 7A:
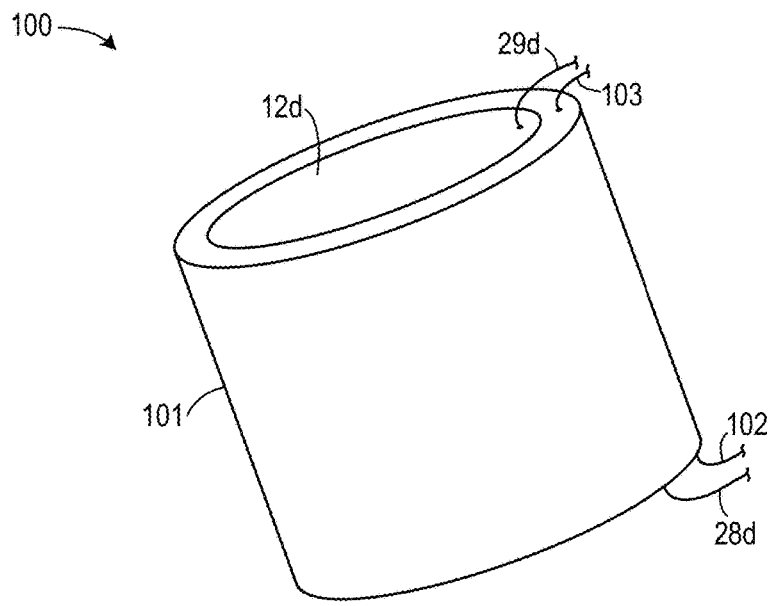
FIG. 7A is a perspective view of an additional thermal fuse.
Figure 7B:
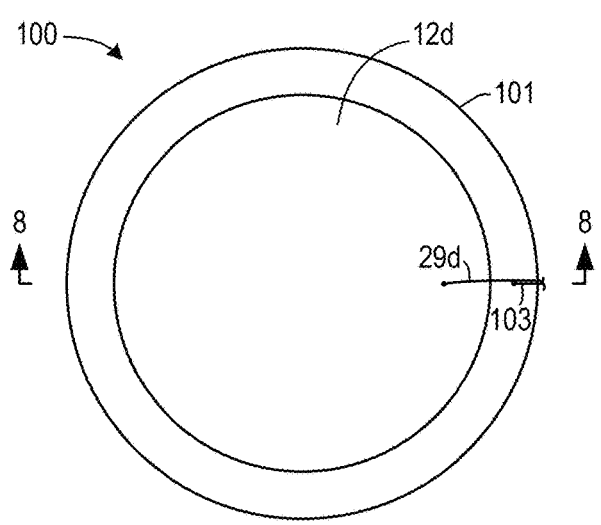
FIGS. 7B and 7C are respective top and bottom views of the thermal fuse of FIG. 7A.
Figure 7C:
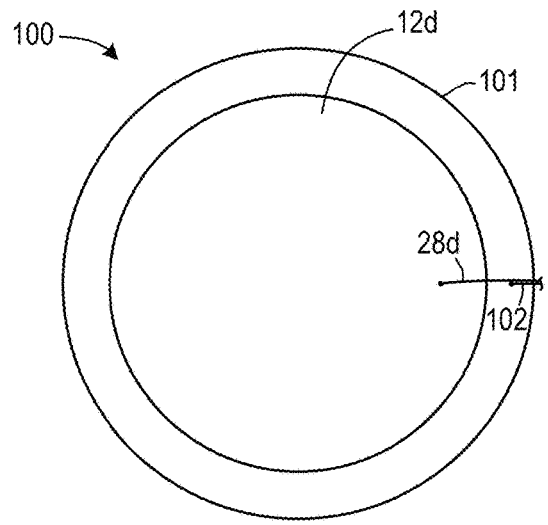

FIG. 7A is a perspective view of an example fuse 100 that may be used as a triggering device that is configured to activate on command. FIG. 7B is a top view of the fuse 100. FIG. 7C is a bottom view of the fuse 100. The fuse 100 may comprise a thermal fuse 12d and a heater 101. The thermal fuse 12d may comprise leads 27d and 29d. The heater 101 may comprise leads 102 and 103.

Figure 8:
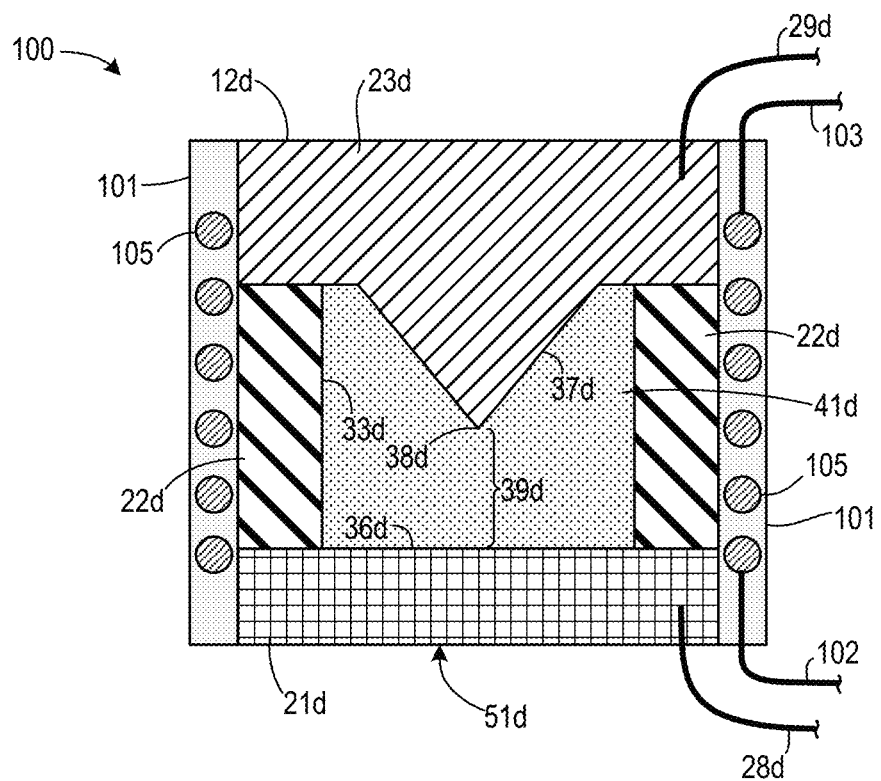
FIG. 8 is a partially schematic area cross-sectional view taken from the location indicated in FIG. 7B.

FIG. 8 is an enlarged, partially schematic, area cross-sectional view of the fuse 100 taken from the location indicated in FIG. 7B. The thermal fuse 12d may comprise a conductor 21d, an insulator 22d, an electrode 23d, leads 28d and 29d, and a block 41d. The conductor 21d may comprise a disc-shaped (or other-shaped) portion of a conductive material that may be the same as, or similar to, the material used for the conductor 21. The insulator 22d may comprise a cylindrically-shaped (or other-shaped) portion of an insulating material that is the same as, or similar to, the material used for the insulator 22. The insulator 22d may comprise a cavity 33d (e.g., a through-hole) that extends from one side of the insulator 22d to the other. The electrode 23d may comprise a disc-shaped (or other-shaped) portion of material that may be the same as, or similar to, the material used for the electrode 23. The electrode 23d may comprise a protrusion 37d that extends into the cavity 33d and that includes an end 38d that is separated from a surface 36d of the conductor 21d. The block 41d may comprise a PCM that is the same as or similar to the PCM of the block 41, and may fill the volume of the cavity 33d not filled by the protrusion 37d. The lead 28d may be electrically connected to the conductor 21d and the lead 29d may be electrically connected to the electrode 23d. The heater 101 may be wrapped around the thermal fuse 12d and may comprise an electrically-powered heating coil 105 and/or other electrically-powered heating elements (e.g., film heaters). The leads 102 and 103 may be electrically connected to the heating coil 105.

A bottom surface 51d of the conductor 21d may be placed into contact with an explosive, propellant, or other material that is to be ignited. The bottom surface 51d may, similar to the bottom surface 51c of the thermal fuse 12c, comprise an adhesive. The leads 102 and 28d may be connected to a high or low side of a power source, and the leads 103 and 29d may be connected to the other of the high or low side of that power source, to apply a voltage across the coil 105 and across the conductor 21d and the electrode 23d, and to cause current flow through the coil 105. As the coil 105 heats, the temperature of the block 41d reaches $T_{act}$. This causes, in a manner similar to that described above in connection with the fuse 12, an electrochemical plasma discharge arc to form between the end 38d and the conductor 21d. This arc burns/melts through the conductor 21d and then ignites the explosive, propellant, or other material to which the bottom surface 51d is attached. Optionally, the bottom side 51d may be attached to a layer of a thermite charge (e.g., similar to the charge 47) or other primer, with that charge/primer placed into contact with an explosive, propellant, and/or other material. In such a configuration, activation of the fuse 100 may ignite the charge/primer, with the primer/charge then igniting the explosive, propellant, and/or other material.

Figure 9A:
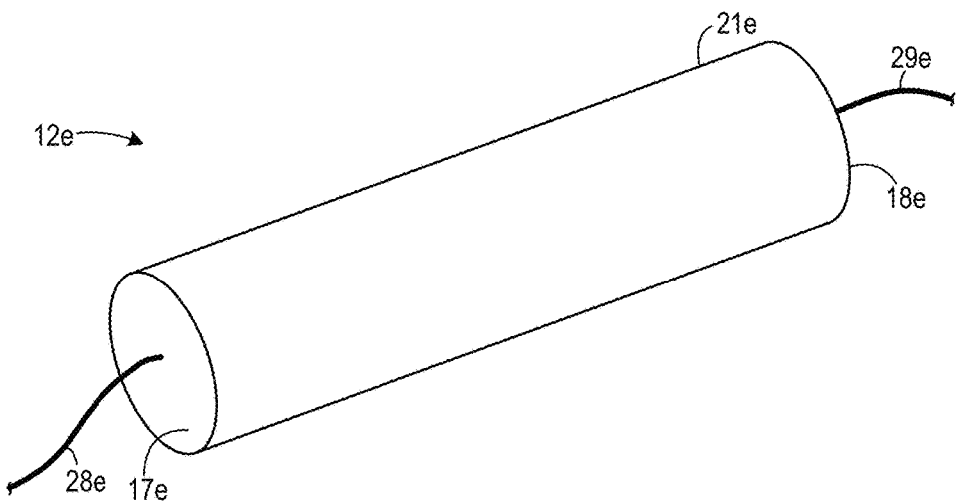
FIG. 9A is a perspective view of a further thermal fuse.
Figure 9B:
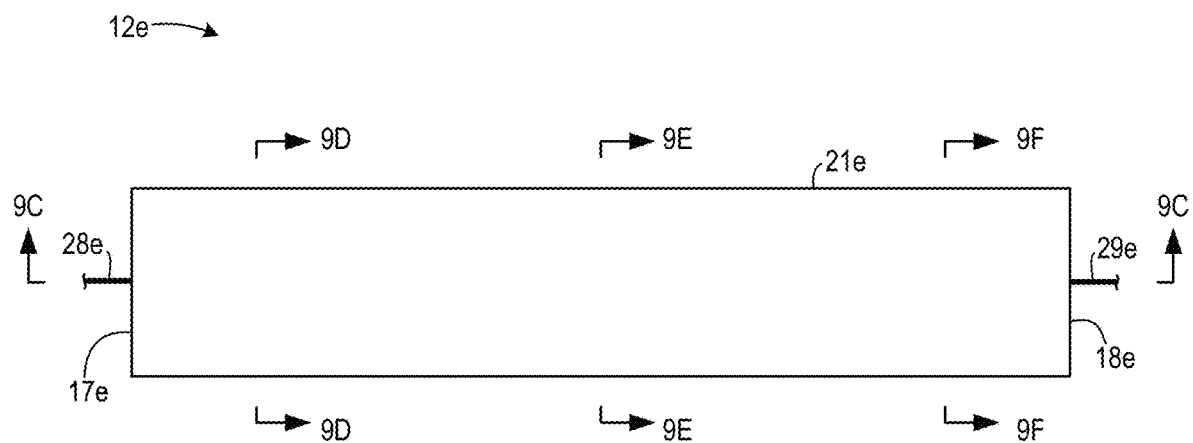
FIG. 9B is a side view of the thermal fuse of FIG. 9A.

FIG. 9A is a perspective view of an example thermal fuse 12e. FIG. 9B is side view of the thermal fuse 12e. The thermal fuse 12e may be similar to thermal fuses described above, but may comprise a cylindrical configuration in which an electrode forms an inner core.

Figure 9C:
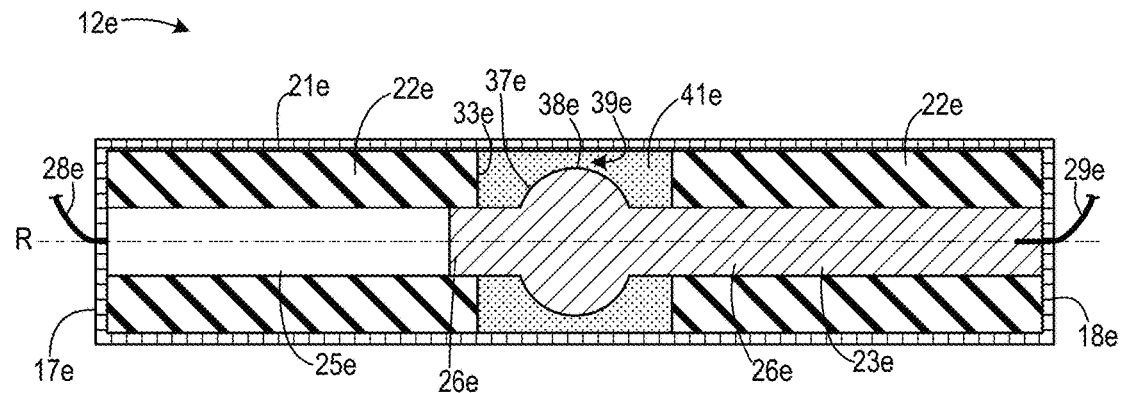
FIGS. 9C, 9D, 9E, and 9F are partially schematic area cross-sectional views taken from the locations indicated in FIG. 9B.

This configuration is shown in FIG. 9C, a partially schematic area cross-sectional view of the thermal fuse 12e taken from the location indicated in FIG. 9B. The thermal fuse 12e may comprise a conductor 21e, insulators 22e, an electrode 23e, and a cavity 41e. The conductor 21e, insulators 22e, electrode 23e, and ring 41e may be rotationally symmetric about a longitudinal axis R. The thermal fuse 12e may further comprise a lead 28e, which is electrically connected to the conductor 21e at a first end 17e of the thermal fuse 12e, and a lead 29e, which is electrically connected to the conductor 21e and to the electrode 23e at a second end 18e of the thermal fuse 12e. The thermal fuse 12e may be used in the circuit 10 (FIG. 1) in connection with, or as an alternative to, the thermal fuse 12. For example, the lead 28e may be used to connect to a higher voltage part of the circuit and the lead 29e may be used to connect to a lower voltage part of the circuit, or vice versa.

The function of the conductor 21e in the thermal fuse 12e may be similar to that of the conductor 21 of the thermal fuse 12. For example, and prior to activation, the conductor 21e may provide a path for flow of direct current between the leads 28e and 29e. During activation a voltage across the conductor 21e and the electrode 23e may be used to generate an electrochemical plasma arc. The conductor 21e may be formed from a material that is the same as, or similar to, the material used to form the conductor 21. Although example dimensions for the conductor 21e comprise a length between 5 mm and 30 mm, an inside diameter of between 1.01 mm and 6 mm, and a wall thickness between 0.01 mm and 3 mm, the conductor 21e may have a length, inside diameter, and/or wall thickness that is outside of any of those ranges.

The function of the insulators 22e in the thermal fuse 12e may be similar to that of the insulator 22 of the thermal fuse 12. For example, the insulators 22e may provide electrical isolation between the conductor 21e and the electrode 23e. The insulators 22e, which may be formed from a material that is the same as, or similar to, the material used to form the insulator 22, may be hollow cylinders. An outer diameter of each of the insulators 22e may correspond to (e.g., be the same as or slightly less than) the inner diameter of the conductor 21e. An inner diameter of each of the insulators 22e may correspond to (e.g., be the same as or slightly larger than) the outer diameter of a shaft portion of the electrode 23e. An interior of a first of the insulators 22e may comprise an air cavity 25e and a portion of the electrode 23e, and an interior of a second of the insulators 22e may be filled by another portion of the electrode 23e.

The function of the electrode 23e in the thermal fuse 12e may be similar to that of the electrode 23 of the thermal fuse 12. For example, during activation, the electrode 23e may form part of a current path for creation of an electrochemical plasma arc. The electrode 23e may be formed from a material that is the same as, or similar to, the material used to form the electrode 23. The electrode 23 may comprise a cylindrical shaft 26e and a protrusion 37e. The protrusion 37e, which may take the form of a ring, ridge, flange, or other structure extending outward from the shaft 26e, may have a hemispherical cross-section (as shown in FIG. 9C), a triangular cross-section (similar to that of the protrusion 37), and/or another shape. Although example dimensions for the electrode 23e may comprise a length of between 5 mm and 20 mm and a shaft 26e diameter of between 1 mm and 5 mm, the electrode 23e may have a length and/or shaft diameter outside of those ranges.

A cavity 33e may be located between adjacent ends the insulators 22e and between an inner surface of the conductor 21e and an outer surface of the electrode 23e. The block 41e, which may be ring-shaped, may fill the cavity 33e and may comprise PCM. The PCM of the block 41e may be the same as, or similar to, the PCM used for the block 41. An end 38e of the protrusion 37e may coincide with an outer circumference of the protrusion 37e. The end 38e may be separated from the inner surface of the conductor 21e by a gap 39e filled with the PCM of the block 41e.

Figures 9D, 9E, 9F:
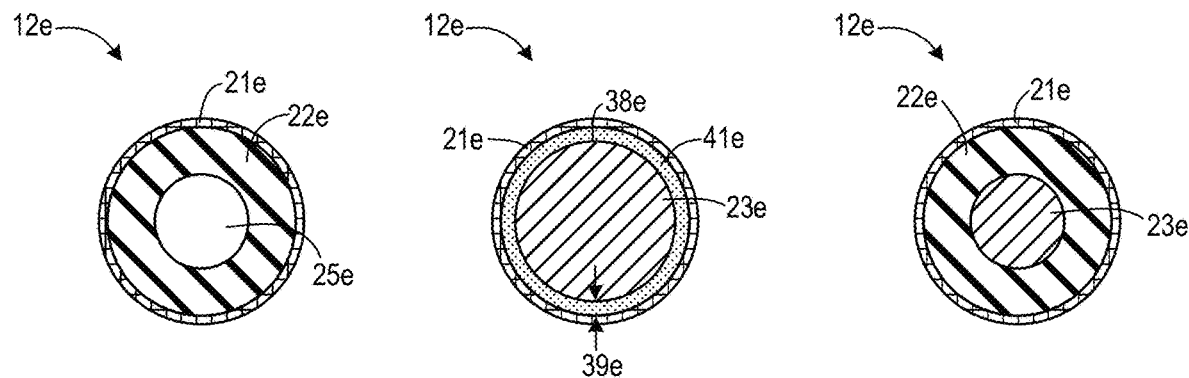

FIGS. 9D, 9E, and 9F are partially schematic area cross-sectional views of the thermal fuse 12e taken from the locations indicated in FIG. 9B. FIG. 9D shows a portion of the thermal fuse 12e located midway between the end 38e of the protrusion 37e and the first end 17e of the thermal fuse 12e. As shown in FIG. 9D, a first of the insulators 22e may surround the air gap 25e, and may be surrounded by the conductor 21e. FIG. 9E shows a portion of the thermal fuse located at the end 38e of the protrusion 37e of the electrode 23e. Also shown in FIG. 9E are the gap 39e, which may surround the end 38e and be surrounded by the conductor 21e, as well as a portion of the block 41e. FIG. 9F shows a portion of the thermal fuse 12e located midway between the end 38e of the protrusion 37e and the second end 18e of the thermal fuse 12e. The shaft 26e of the electrode 23e may fill the interior of the other insulator 22e, which may in turn be surrounded by the conductor 21e.

The thermal fuse 12e may, when installed in a circuit, operate the same as or similar to the fuse 12. If the temperature T of the block 41e is below the activation temperature $T_{act}$, current of the circuit may flow between the leads 28e and 29e and through the conductor 21e. Although a voltage may be created across the gap 39e, current does not flow through the electrode 23e. If the temperature T of the block 41e reaches or exceeds the activation temperature $T_{act}$, the thermal fuse 12e may activate in a manner that is the same or similar to that described above in connection with the thermal fuse 12. In particular, release of water or hydrogen peroxide from the PCM of the block 41e may contact portions of the electrode 23e in the cavity 33e and initiate an exothermic chemical reaction that releases hydrogen. Because of the voltage across the gap 39e, an electrochemical discharge plasma arc may be formed between the protrusion 37e and the conductor 21e, which arc may burn and/or melt the material of the conductor 21e about the circumference of the protrusion 37e and cause the electrical connection between the leads 28e and 29e to be severed. As can be appreciated from the above, the electrode 23e and the interface between the protrusion 37e and the conductor 21e are not part of a circuit prior to activation of the thermal fuse 12e. This allows the thermal fuse 12e, when used in a circuit such as the circuit 10, to partially or completely avoid parasitic resistance losses associated with other types of thermal fuses.

A thermal fuse similar to one or more of the thermal fuses described above may be formed without a conductor and may be configured for attachment to, for example, a conductor already present in a circuit. FIG. 10A is a side view of an example of such a thermal fuse 12f. The thermal fuse 12f comprises an insulator 22f (which may, e.g., be the same as or similar to the insulator 22) and an electrode 23f (which may, e.g., be the same as or similar to the electrode 23). A lead 29f (which may, e.g., be the same as or similar to the lead 29) may be embedded in or otherwise attached to the electrode 23f. The thermal fuse 12f may lack a conductor similar to the conductor 21, and an underside 35f of the insulator 22f may be treated with a pressure-sensitive adhesive. A release liner, for example a sheet of wax- or silicone-coated release paper 19f, may be attached to that adhesive.

FIG. 10B is a bottom view of the thermal fuse 12f after removal of the release paper 19f to expose the adhesive 24f on the underside 35f. As also shown in FIG. 10B, the insulator 22f may comprise a cavity 33f (which may, e.g., be the same as or similar to the cavity 33) containing an activation block 41f (which may, e.g., be the same as or similar to the activation block 41). Although not visible in FIGS. 10A and 10B, the electrode 23e may comprise a protrusion (which may, e.g., be the same as or similar to the protrusion 33). As shown in FIG. 10C, the underside 35f may be secured, using the adhesive 24f, to a separate conductor 21f (e.g., a conductive trace already present in a circuit). The lead 29f may be connected to separate conductor 21f (e.g., using a conductive adhesive 31f). The installed fuse 12f may then operate similar to the fuse 12.

Electrodes of thermal fuses, such as those described above, may be formed from one or more materials that are electrically conductive and that cause generation of gaseous hydrogen when exposed to water and/or to hydrogen peroxide ($H_2O_2$). Examples of such materials include various Ga—Al alloys. The presence of Ga in such an alloy prevents oxidation of Al by exposure to air, but allows such oxidation when the alloy is exposed to water and/or to hydrogen peroxide. That oxidation results in release of gaseous hydrogen in an exothermic chemical reaction.

When used to form an electrode such as those described herein, it is beneficial if a Ga—Al alloy maintains good mechanical strength and ductility. New Ga—Al alloys have been developed that may include these characteristics and that may be used to form a thermal fuse electrode or portion thereof. In addition, the developed alloys may comprise microstructures that are estimated to make between 40% (vol.) and 90% (vol.) of non-oxidized Al in the alloy available for a moisture/water-triggered exothermic reaction to release hydrogen. Moreover, the developed alloys may have stabilized melting temperatures that, depending on the formulation, may range from 60° C. to 500° C.

The new Ga—Al alloys comprise groups of alloys of Ga and an aluminum-based master alloy. A first group of these new alloys comprises alloys of Ga and an aluminum-titanium-boron master alloy, Al5Ti1B. The Al5Ti1B master alloy may comprise (and/or consist of or consist essentially of): an amount of titanium (Ti) that forms 5 percent by weight (wt %)±0.2 wt % (of a total weight of Al, Ti, and boron (B) in the master alloy), an amount of B that forms 1 wt %±0.2 wt % (of the total weight of Al, Ti, and B in the master alloy), and an amount of Al that forms a balance wt % (of the total weight of Al, Ti, and B in the master alloy). Alloys of this first group may comprise (and/or consist of or consist essentially of): an amount of Al5Ti1B that forms 30 wt % to 80 wt % (of the total weight of Al5Ti1B and Ga in the alloy) and an amount of Ga that forms a balance wt % (of the total weight of Al5Ti1B and Ga in the alloy).

A second group of these new alloys comprises alloys of another aluminum-titanium-boron master alloy, Al3Ti1B. The Al3Ti1B master alloy may comprise (and/or consist of or consist essentially of): an amount of Ti that forms 3 wt %±0.2 wt % (of a total weight of Al, Ti, and B in the master alloy), an amount of B that forms 1 wt %±0.2 wt % (of the total weight of Al, Ti, and B in the master alloy), and an amount of Al that forms a balance wt % (of the total weight of Al, Ti, and B in the master alloy). Alloys of this second group may comprise (and/or consist of or consist essentially of): an amount of Al3Ti1B that forms 30 wt % to 80 wt % (of the total weight of Al3Ti1B and Ga in the alloy) and an amount of Ga that forms a balance wt % (of the total weight of Al3Ti1B and Ga in the alloy).

A third group of these new alloys comprises alloys of an aluminum-titanium-carbon master alloy, Al3Ti-0.15C. The Al3Ti-0.15C master allow may comprise (and/or consist of or consist essentially of): an amount of titanium (Ti) that forms 3 wt %±0.2 wt % (of a total weight of Al, Ti, and carbon (C) in the master alloy), an amount of C that forms 0.15 wt %±0.05 wt % (of the total weight of Al, Ti, and C in the master alloy), and an amount of Al that forms a balance wt % (of the total weight of Al, Ti, and C in the master alloy). Alloys of this third group may comprise (and/or consist of or consist essentially of): an amount of Al3Ti-0.15C that forms 30 wt % to 80 wt % (of the total weight of Al3Ti-0.15C and Ga in the alloy) and an amount of Ga that forms a balance wt % (of the total weight of Al3Ti-0.15C and Ga in the alloy).

Starting materials for forming alloys of the first group, the second group, and the third group may include granules of the relevant master alloy (Al5Ti1B, Al3Ti1B, or Al3Ti-0.15C) having a particle size of 1-5 mm and Ga having at least 99 mass % (e.g., 99.9 mass %) purity. The starting material proportions of master alloy and Ga may be the same as that of the desired resulting alloy. The starting materials may be heated in air, using a corundum crucible in an electric furnace, at a melting temperature of between 750° C. and 840° C. for approximately 3 hours. The molten mixture may then be poured and cast into Ga—Al ingots.

In alloys of the first group, the second group, and the third group, very fine Al grains may be formed due to the presence of TiB2 or TiC during the alloy forming process. These grains promote uniform dispersion of precipitates, including Ga—Al eutectic phase. The resulting microstructure makes available approximately 40 volume % (vol %) to 90 vol % of non-oxidized Al available for moisture-triggered exothermic reaction, significantly improves the ductility of the alloy, and stabilizes the melting temperature of the alloy.

Additional Ga—Al alloys that may also or alternatively be used to form a thermal fuse electrode, or portion thereof, may include, without limitation, one or more of the following:

Ga-(30-80)wt % Al alloys. Such alloys may, for example, comprise (and/or consist of or consist essentially of): an amount of Al that forms 30 wt % to 80 wt % (of a total weight of Ga and Al in the alloy) and an amount of Ga that forms a balance wt % (of the total weight of Ga and Al in the alloy).

Ga-(30-80)wt % Al-(1-20)wt % Ag alloys (with a balance of Ga≥15 wt %). Such alloys may, for example, comprise (and/or consist of or consist essentially of): an amount of Al that forms 30 wt % to 80 wt % (of a total weight of Ga, Al, and Ag in the alloy), an amount of Ag that forms 1 wt % to 20 wt % (of the total weight of Ga, Al, and Ag in the alloy), and an amount of Ga that forms a balance wt % (of the total weight of Ga, Al, and Ag in the alloy), but with that balance wt % of Ga forming at least 15 wt % (of the total weight of Ga, Al, and Ag in the alloy).

Ga-(30-80)wt % Al-(1-15)wt % Sn alloys (with a balance of Ga≥15 wt %). Such alloys may, for example, comprise (and/or consist of or consist essentially of): an amount of Al that forms 30 wt % to 80 wt % (of a total weight of Ga, Al, and Sn in the alloy), an amount of Sn that forms 1 wt % to 15 wt % (of the total weight of Ga, Al, and Sn in the alloy), and an amount of Ga that forms a balance wt % (of the total weight of Ga, Al, and Sn in the alloy), but with that balance wt % of Ga forming at least 15 wt % (of the total weight of Ga, Al, and Sn in the alloy).

Ga-(30-80)wt % Al-(1-20)wt % Cu alloys (with a balance of Ga≥15 wt %). Such alloys may, for example, comprise (and/or consist of or consist essentially of): an amount of Al that forms 30 wt % to 80 wt % (of a total weight of Ga, Al, and Cu in the alloy), an amount of Cu that forms 1 wt % to 20 wt % (of the total weight of Ga, Al, and Cu in the alloy), and an amount of Ga that forms a balance wt % (of the total weight of Ga, Al, and Cu in the alloy), but with that balance wt % of Ga forming at least 15 wt % (of the total weight of Ga, Al, and Cu in the alloy).

Ga-(30-80)wt % Al-(1-15)wt % Sn-(1-10)wt % Ag alloys (with a balance of Ga≥15 wt %). Such alloys may, for example, comprise (and/or consist of or consist essentially of): an amount of Al that forms 30 wt % to 80 wt % (of a total weight of Ga, Al, Sn, and Ag in the alloy), an amount of Sn that forms 1 wt % to 15 wt % (of the total weight of Ga, Al, Sn, and Ag in the alloy), an amount of Ag that forms 1 wt % to 10 wt % (of the total weight of Ga, Al, Sn, and Ag in the alloy), and an amount of Ga that forms a balance wt % (of the total weight of Ga, Al, Sn, and Ag in the alloy), but with that balance wt % of Ga forming at least 15 wt % (of the total weight of Ga, Al, Sn, and Ag in the alloy).

Ga-(30-80)wt % Al-(1-20)wt % Fe-(1-15)wt % Si alloys (with a balance of Ga≥15 wt %). Such alloys may, for example, comprise (and/or consist of or consist essentially of): an amount of Al that forms 30 wt % to 80 wt % (of a total weight of Ga, Al, iron (Fe), and silicon (Si) in the alloy), an amount of Fe that forms 1 wt % to 20 wt % (of the total weight of Ga, Al, Fe, and Si in the alloy), an amount of Si that forms 1 wt % to 15 wt % (of the total weight of Ga, Al, Fe, and Si in the alloy), and an amount of Ga that forms a balance wt % (of the total weight of Ga, Al, Fe, and Si in the alloy), but with that balance wt % of Ga forming at least 15 wt % (of the total weight of Ga, Al, Fe, and Si in the alloy).

Ga-(30-80)wt % Al-(1-20)wt % Sn-(1-10)wt % Pb alloys (with a balance of Ga≥15 wt %). Such alloys may, for example, comprise (and/or consist of or consist essentially of): an amount of Al that forms 30 wt % to 80 wt % (of a total weight of Ga, Al, Sn, and lead (Pb) in the alloy), an amount of Sn that forms 1 wt % to 20 wt % (of the total weight of Ga, Al, Sn, and Pb in the alloy), an amount of Pb that forms 1 wt % to 10 wt % (of the total weight of Ga, Al, Sn, and Pb in the alloy), and an amount of Ga that forms a balance wt % (of the total weight of Ga, Al, Sn, and Pb in the alloy), but with that balance wt % of Ga forming at least 15 wt % (of the total weight of Ga, Al, Sn, and Pb in the alloy).

Ga-(30-80)wt % Al-(1-20)wt % Ni-(1-15)wt % Zn alloys (with a balance of Ga≥15 wt %). Such alloys may, for example, comprise (and/or consist of or consist essentially of): an amount of Al that forms 30 wt % to 80 wt % (of a total weight of Ga, Al, Ni, and zinc (Zn) in the alloy), an amount of Ni that forms 1 wt % to 20 wt % (of the total weight of Ga, Al, Ni, and Zn in the alloy), an amount of Zn that forms 1 wt % to 15 wt % (of the total weight of Ga, Al, Ni, and Zn in the alloy), and an amount of Ga that forms a balance wt % (of the total weight of Ga, Al, Ni, and Zn in the alloy), but with that balance wt % of Ga forming at least 15 wt % (of the total weight of Ga, Al, Ni, and Zn in the alloy).

Ga-(30-80)wt % Al-(1-20)wt % Ni-(1-15)wt % Zn-(1-10) wt % Ag alloys (with a balance of Ga≥15 wt %). Such alloys may, for example, comprise (and/or consist of or consist essentially of): an amount of Al that forms 30 wt % to 80 wt % (of a total weight of Ga, Al, Ni, Zn, and Ag in the alloy), an amount of Ni that forms 1 wt % to 20 wt % (of the total weight of Ga, Al, Ni, Zn, and Ag in the alloy), an amount of Zn that forms 1 wt % to 15 wt % (of the total weight of Ga, Al, Ni, Zn, and Ag in the alloy), an amount of Ag that forms 1 wt % to 10 wt % (of the total weight of Ga, Al, Ni, Zn, and Ag in the alloy), and an amount of Ga that forms a balance wt % (of the total weight of Ga, Al, Ni, Zn, and Ag in the alloy), but with that balance wt % of Ga forming at least 15 wt % (of the total weight of Ga, Al, Ni, Zn, and Ag in the alloy).

Ga-(30-80)wt % Al-(1-20)wt % Ni-(1-20)wt % Fe-(1-20) wt % Cu-(1-15)wt % Cr alloys (with a balance of Ga≥15 wt %). Such alloys may, for example, comprise (and/or consist of or consist essentially of): an amount of Al that forms 30 wt % to 80 wt % (of a total weight of Ga, Al, Ni, Fe, Cu, and chromium (Cr) in the alloy), an amount of Ni that forms 1 wt % to 20 wt % (of the total weight of Ga, Al, Ni, Fe, Cu, and Cr in the alloy), an amount of Fe that forms 1 wt % to 20 wt % (of the total weight of Ga, Al, Ni, Fe, Cu, and Cr in the alloy), an amount of Cu that forms 1 wt % to 20 wt % (of the total weight of Ga, Al, Ni, Fe, Cu, and Cr in the alloy), an amount of Cr that forms 1 wt % to 15 wt % (of the total weight of Ga, Al, Ni, Fe, Cu, and Cr in the alloy), and an amount of Ga that forms a balance wt % (of the total weight of Ga, Al, Ni, Fe, Cu, and Cr in the alloy), but with that balance wt % of Ga forming at least 15 wt % (of the total weight of Ga, Al, Ni, Fe, Cu, and Cr in the alloy).

Ga-(30-80)wt % Al-(1-15)wt % In-(1-10)wt % Sn alloys (with a balance of Ga≥15 wt %). Such alloys may, for example, comprise (and/or consist of or consist essentially of): an amount of Al that forms 30 wt % to 80 wt % (of a total weight of Ga, Al, indium (In), and Sn in the alloy), an amount of In that forms 1 wt % to 10 wt % (of the total weight of Ga, Al, In, and Sn in the alloy), an amount of Sn that forms 1 wt % to 10 wt % (of the total weight of Ga, Al, In, and Sn in the alloy), and an amount of Ga that forms a balance wt % (of the total weight of Ga, Al, In, and Sn in the alloy), but with that balance wt % of Ga forming at least 15 wt % (of the total weight of Ga, Al, In, and Sn in the alloy).

Ga-(30-80)wt % Al-(1-20)wt % In alloys (with a balance of Ga≥15 wt %). Such alloys may, for example, comprise (and/or consist of or consist essentially of): an amount of Al that forms 30 wt % to 80 wt % (of a total weight of Ga, Al, and In in the alloy), an amount of In that forms 1 wt % to 20 wt % (of the total weight of Ga, Al, and In in the alloy), and an amount of Ga that forms a balance wt % (of the total weight of Ga, Al, and In in the alloy), but with that balance wt % of Ga forming at least 15 wt % (of the total weight of Ga, Al, and In in the alloy).

Ga-(30-80)wt % Al-(1-20)wt % In-(1-15)wt % Zn alloys (with a balance of Ga≥15 wt %). Such alloys may, for example, comprise (and/or consist of or consist essentially of): an amount of Al that forms 30 wt % to 80 wt % (of a total weight of Ga, Al, In, and Zn in the alloy), an amount of In that forms 1 wt % to 15 wt % (of the total weight of Ga, Al, In, and Zn in the alloy), an amount of Zn that forms 1 wt % to 15 wt % (of the total weight of Ga, Al, In, and Zn in the alloy), and an amount of Ga that forms a balance wt % (of the total weight of Ga, Al, In, and Zn in the alloy), but with that balance wt % of Ga forming at least 15 wt % (of the total weight of Ga, Al, In, and Zn in the alloy).

Ga-(30-80)wt % Al-(1-20)wt % In-(1-20)wt % Sn-(1-15) wt % Zn alloys (with a balance of Ga≥15 wt %). Such alloys may, for example, comprise (and/or consist of or consist essentially of): an amount of Al that forms 30 wt % to 80 wt % (of a total weight of Ga, Al, In, Sn, and Zn in the alloy), an amount of In that forms 1 wt % to 20 wt % (of the total weight of Ga, Al, In, Sn, and Zn in the alloy), an amount of Sn that forms 1 wt % to 20 wt % (of the total weight of Ga, Al, In, Sn, and Zn in the alloy), an amount of Zn that forms 1 wt % to 15 wt % (of the total weight of Ga, Al, In, Sn, and Zn in the alloy), and an amount of Ga that forms a balance wt % (of the total weight of Ga, Al, In, Sn, and Zn in the alloy), but with that balance wt % of Ga forming at least 15 wt % (of the total weight of Ga, Al, In, Sn, and Zn in the alloy).

Ga-(10-80)wt % Al-(1-20)wt % In-(1-20)wt % Sn-(1-60) wt % Al5Ti1B alloys (with a balance of Ga≥15 wt %). Such alloys may, for example, comprise (and/or consist of or consist essentially of): an amount of Al that forms 10 wt % to 80 wt % (of a total weight of Ga, Al, In, Sn, and Al5Ti1B in the alloy), an amount of In that forms 1 wt % to 20 wt % (of the total weight of Ga, Al, In, Sn, and Al5Ti1B in the alloy), an amount of Sn that forms 1 wt % to 20 wt % (of the total weight of Ga, Al, In, Sn, and Al5Ti1B in the alloy), an amount of Al5Ti1B that forms 1 wt % to 60 wt % (of the total weight of Ga, Al, In, Sn, and Al5Ti1B in the alloy), and an amount of Ga that forms a balance wt % (of the total weight of Ga, Al, In, Sn, and Al5Ti1B in the alloy), but with that balance wt % of Ga forming at least 15 wt % (of the total weight of Ga, Al, In, Sn, and Al5Ti1B in the alloy).

The above-mentioned additional Ga—Al alloys may be formed using methods similar to those described above in connection with forming alloys of the first group, the second group, and the third group. Melting temperatures may be adjusted based on a particular formulation.

Other materials that are electrically conductive, and that may cause release of gaseous hydrogen when exposed to water or to hydrogen peroxide ($H_2O_2$), could also or alternatively be used to form a thermal fuse electrode or a portion thereof. Such materials may include, without limitation, one or more of the following:

Al-(1-10)wt % KOH alloys. Such alloys may, for example, comprise (and/or consist of or consist essentially of): an amount of potassium hydroxide (KOH) that forms 1 wt % to 10 wt % (of a total weight of Al and KOH in the alloy) and an amount of Al that forms a balance wt % (of the total weight of Al and KOH in the alloy).

Al-(1-10)wt % $BaCl_2$ alloys. Such alloys may, for example, comprise (and/or consist of or consist essentially of): an amount of barium chloride ($BaCl_2$) that forms 1 wt % to 10 wt % (of a total weight of Al and $BaCl_2$ in the alloy) and an amount of Al that forms a balance wt % (of the total weight of Al and $BaCl_2$ in the alloy).

Al-(1-10)wt % KCl alloys. Such alloys may, for example, comprise (and/or consist of or consist essentially of): an amount of potassium chloride (KCl) that forms 1 wt % to 10 wt % (of a total weight of Al and KCl in the alloy) and an amount of Al that forms a balance wt % (of the total weight of Al and KCl in the alloy).

Al-(1-20)wt % Ni-(1-10)wt % NaCl alloys. Such alloys may, for example, comprise (and/or consist of or consist essentially of): an amount of Ni that forms 1 wt % to 20 wt % (of a total weight of Al, Ni, and sodium chloride (NaCl) in the alloy), an amount of NaCl that forms 1 wt % to 10 wt % (of the total weight of Al, Ni, and NaCl in the alloy), and an amount of Al that forms a balance wt % (of the total weight of Al, Ni, and NaCl in the alloy).

Al-(3-30)wt % Bi alloys. Such alloys may, for example, comprise (and/or consist of or consist essentially of): an amount of bismuth (Bi) that forms 3 wt % to 30 wt % (of a total weight of Al and Bi in the alloy) and an amount of Al that forms a balance wt % (of the total weight of Al and Bi in the alloy).

Al-(1-30)wt % Bi-(1-10)wt % C alloys. Such alloys may, for example, comprise (and/or consist of or consist essentially of): an amount of Bi that forms 1 wt % to 30 wt % (of a total weight of Al, Bi, and C in the alloy), an amount of C that forms 1 wt % to 10 wt % (of a total weight of Al, Bi, and C in the alloy), and an amount of Al that forms a balance wt % (of the total weight of Al, Bi, and C in the alloy).

Al-(1-60)wt % Zn-(1-20)wt % Sn alloys. Such alloys may, for example, comprise (and/or consist of or consist essentially of): an amount of Zn that forms 1 wt % to 60 wt % (of a total weight of Al, Zn, and Sn in the alloy), an amount of Sn that forms 1 wt % to 20 wt % (of a total weight of Al, Zn, and Sn in the alloy), and an amount of Al that forms a balance wt % (of the total weight of Al, Zn, and Sn in the alloy).

Al-(1-10)wt % BiOCl alloys. Such alloys may, for example, comprise (and/or consist of or consist essentially of): an amount of bismuth oxychloride (BiOCl) that forms 1 wt % to 10 wt % (of a total weight of Al and BiOCl in the alloy) and an amount of Al that forms a balance wt % (of the total weight of Al and BiOCl in the alloy).

Al-(1-10)wt % $NaBH_4$ alloys. Such alloys may, for example, comprise (and/or consist of or consist essentially of): an amount of sodium borohydride ($NaBH_4$) that forms 1 wt % to 10 wt % (of a total weight of Al and $NaBH_4$ in the alloy) and an amount of Al that forms a balance wt % (of the total weight of Al and $NaBH_4$ in the alloy).

Al-(1-10)wt % $NaMgH_3$ alloys. Such alloys may, for example, comprise (and/or consist of or consist essentially of): an amount of sodium magnesium hydride ($NaMgH_3$) that forms 1 wt % to 10 wt % (of a total weight of Al and $NaMgH_3$ in the alloy) and an amount of Al that forms a balance wt % (of the total weight of Al and $NaMgH_3$ in the alloy).

Al-(1-10 wt %)Al(OH)$_3$ alloys. Such alloys may, for example, comprise (and/or consist of or consist essentially of): an amount of aluminum hydroxide (Al(OH)$_3$) that forms 1 wt % to 10 wt % (of a total weight of Al and Al(OH)$_3$ in the alloy) and an amount of Al that forms a balance wt % (of the total weight of Al and Al(OH)$_3$ in the alloy).

Any of a variety of PCMs or a combination of PCMs may be used to form an activation block of a thermal fuse. Numerous compounds are known to release water at a particular temperature and can be used, either alone in combination with other materials, to obtain a PCM that has a desired activation temperature. For example, various salt hydrates melt at known temperatures and release water. Examples of such salt hydrates include, without limitation, sodium phosphate dodecahydrate ($Na_3$—$PO_4$.12$H_2O$), lithium acetate dihydrate ($LiCH_3COO$.2$H_2O$), sodium pyrophosphate dodecahydrate ($Na_2P_2O_7$.12$H_2O$), barium hydroxide octahydrate (Ba(OH)$_2$.8$H_2O$), aluminum nitrate octahydrate (Al(NO$_3$)$_2$.8$H_2O$), magnesium nitrate hexahydrate (Mg(NO$_3$).6$H_2O$), ammonium aluminum sulfate dodecahydrate (NH$_4$Al(SO$_4$)$_2$.12$H_2O$), aluminum sulfite dodecahydrate (Al$_2$(SO$_3$)$_2$.12$H_2O$), and magnesium chloride hexahydrate (MgCl$_2$.6$H_2O$). Water-based PCMs having predetermined melting temperatures are commercially available.

A PCM may be formulated to be a solid before reaching a desired activation temperature, and to change to a partial or semi-liquid when the desired activation temperature is reached. For example, PCMs may be formulated to have activation temperatures between 60° C. and 120° C. (e.g., for thermal fuses that may be used to protect lithium-ion battery systems). Such PCMs may comprise mixtures of water, salt water, other ionic liquids, water-soluble polymer resins, and metal oxide additives (e.g., $Fe_3O_2$, MnO powders, etc.). Also or alternatively, a PCM may be blended with a salt hydrate, an ionic compound (e.g., HCl, KCl, KOH, NaCl, $Na_2SiO_3$, $AlCl_3$, etc.), a water absorbing resin, urea, carboxylmethyl cellulose, glycerin, and/or other materials.

An example PCM with an activation temperature between 60° C. and 120° C. may comprise 3 wt % to 23 wt % of NaCl or KCL, 5 wt % to 50 wt % of $Fe_2O_3$ or MnO, 3 wt % to 30 wt % of a water soluble poly(ethylene oxide) polymer (e.g., having a general composition of 95% to 100% poly(ethylene oxide), up to 3% fumed silica, and up to 1% calcium as mixed salts (e.g., a polymer resin such as POLYOX™ WSR N750 or POLYOX™ WSR 301)), and a balance of $H_2O$ or $H_2O_2$. Increasing the percentages of the water soluble poly (ethylene oxide) polymer and the metal oxide additive(s) will cause the phase change temperature of the resulting PCM to increase. The example PCM may be produced by first stirring the ingredients together until a uniform mixture is formed. Depending on the mixtures used, the stirring time may range from 3 minutes to 60 minutes. Next, the mixture may be molded into a desired shape and size for a thermal fuse. The molded PCM may then be dried for at least 2-3 hours at around 100-120° C., or at least 12 hours at room temperature.

For the avoidance of doubt, the present application includes, but is not limited to, the subject-matter described in the following numbered clauses:

1. A Ga—Al alloy comprising, consisting of, or consisting essentially of an amount of an Al5Ti1B master alloy that forms 30 wt % to 80 wt %, of the total weight of Al5Ti1B and Ga in the alloy, and an amount of Ga that forms a balance wt % of the total weight of Al5Ti1B and Ga in the alloy.
2. A Ga—Al alloy comprising, consisting of, or consisting essentially of an amount of an Al3Ti1B master alloy that forms 30 wt % to 80 wt %, of the total weight of Al3Ti1B and Ga in the alloy, and an amount of Ga that forms a balance wt % of the total weight of Al3Ti1B and Ga in the alloy.
3. A Ga—Al alloy comprising, consisting of, or consisting essentially of an amount of an Al3Ti-0.15C master alloy that forms 30 wt % to 80 wt %, of the total weight of Al3Ti-0.15C and Ga in the alloy, and an amount of Ga that forms a balance wt % of the total weight of Al3Ti-0.15C and Ga in the alloy.
4. An electrode, wherein part or all of the electrode is formed from one or more of: the Ga—Al alloy of clause 1, the Ga—Al alloy of clause 2, the Ga—Al alloy of clause 3, one or more Ga-(30-80)wt % Al alloys, one or more Ga-(30-80)wt % Al-(1-20) wt % Ag alloys with a balance of Ga≥15 wt %, one or more Ga-(30-80)wt % Al-(1-15)wt % Sn alloys with a balance of Ga≥15 wt %, one or more Ga-(30-80)wt % Al-(1-20)wt % Cu alloys with a balance of Ga≥15 wt %, one or more Ga-(30-80)wt % Al-(1-15)wt % Sn-(1-10)wt % Ag alloys with a balance of Ga≥15 wt %, one or more Ga-(30-80)wt % Al-(1-20)wt % Fe-(1-15)wt % Si alloys with a balance of Ga≥15 wt %, one or more Ga-(30-80)wt % Al-(1-20)wt % Sn-(1-10)wt % Pb alloys with a balance of Ga≥15 wt %, one or more Ga-(30-80)wt % Al-(1-20)wt % Ni-(1-15)wt % Zn alloys with a balance of Ga≥15 wt %, one or more Ga-(30-80)wt % Al-(1-20)wt % Ni-(1-15)wt % Zn-(1-

10)wt % Ag alloys with a balance of Ga≥15 wt %, one or more Ga-(30-80)wt % Al-(1-20)wt % Ni-(1-20)wt % Fe-(1-20)wt % Cu-(1-15)wt % Cr alloys with a balance of Ga≥15 wt %, one or more Ga-(30-80)wt % Al-(1-15)wt % In-(1-10)wt % Sn alloys with a balance of Ga≥15 wt %, one or more Ga-(30-80)wt % Al-(1-20)wt % In alloys with a balance of Ga≥15 wt %, one or more Ga-(30-80)wt % Al-(1-20)wt % In-(1-15)wt % Zn alloys with a balance of Ga≥15 wt %, one or more Ga-(30-80)wt % Al-(1-20)wt % In-(1-20)wt % Sn-(1-15)wt % Zn alloys with a balance of Ga≥15 wt %, one or more Ga-(10-80) wt % Al-(1-20)wt % In-(1-20)wt % Sn-(1-60)wt % Al5Ti1B alloys with a balance of Ga≥15 wt %, one or more Al-(1-10)wt % KOH alloys, one or more Al-(1-10)wt % $BaCl_2$ alloys, one or more Al-(1-10)wt % KCl alloys, one or more Al-(1-20)wt % Ni-(1-10)wt % NaCl alloys, one or more Al-(3-30)wt % Bi alloys, one or more Al-(1-30)wt % Bi-(1-10)wt % C alloys, one or more Al-(1-60)wt % Zn-(1-20)wt % Sn alloys, one or more Al-(1-10)wt % BiOCl alloys, one or more Al-(1-10)wt % $NaBH_4$ alloys, one or more Al-(1-10)wt % $NaMgH_3$ alloys, one or more Al-(1-10 wt %)$Al(OH)_3$ alloys, and/or one or more other materials that are electrically conductive and that cause release of gaseous hydrogen when exposed to water or to hydrogen peroxide ($H_2O_2$).

5. A thermal fuse comprising the electrode of clause 4.
6. The thermal fuse of clause 5, further comprising a PCM.
7. The thermal fuse of clause 6, wherein the PCM is adjacent to at least a portion of the electrode and/or separates the at least the portion of the electrode from a conductor.
8. The thermal fuse of clause 6 or clause 7, wherein the PCM is configured to release, based on reaching an activation temperature, at least one of water or hydrogen peroxide.
9. The thermal fuse of clause 8, wherein the activation temperature is between 60° C. and 120° C.
10. The thermal fuse of any of clauses 5 through 9, further comprising an insulator.
11. The thermal fuse of clause 10, further comprising a conductor, wherein at least a portion of the conductor is separated from at least a portion of the electrode by the insulator.
12. The thermal fuse of any of clause 10 or clause 11, wherein the PCM is located in a cavity of the insulator.
13. The thermal fuse of any of clauses 5 through 12, further comprising a conductor.
14. The thermal fuse of any of clauses 5 through 13, further comprising a charge positioned for ignition by activation of the thermal fuse.
15. The thermal fuse of clause 14, wherein the charge is positioned adjacent or in proximity to a conductor.
16. The thermal fuse of any of clauses 5 through 15, further comprising a heating element.
17. The thermal fuse of any of clauses 5 through 16, further comprising an adhesive applied to a surface of the thermal fuse and, optionally, a release liner in contact with the adhesive.
18. The thermal fuse of any of clauses 5 through 17, wherein the thermal fuse is cylindrical.
19. The thermal fuse of any of clauses 5 through 17, wherein one or more of the electrode, an insulator, or a conductor of the thermal fuse is planar.
20. The thermal fuse of any of clauses 5 through 19, wherein at least a portion of the thermal fuse is part of an electrical circuit.
21. An article comprising a conductor.
22. The article of clause 21, further comprising an electrode comprising a first portion, wherein at least the first portion is formed from a Ga—Al alloy and/or from one or more other materials of clause 4.
23. The article of clause 21 or clause 22, further comprising an activation block located between the first portion of the electrode and the conductor, wherein the activation block comprises a PCM configured to release, based on the activation block reaching an activation temperature, least one of water or hydrogen peroxide.
24. The article of any of clauses 21 through 23, further comprising an insulator located between the electrode and the conductor, wherein the insulator comprises a cavity, and wherein the activation block is located in the cavity.
25. The article of any of clauses 21 through 24, wherein the insulator surrounds the electrode and the conductor surrounds the insulator.
26. The article of any of clauses 21 through 25, wherein the cavity extends from a first side of the insulator to a second side of the insulator, wherein the electrode is attached to the first side and comprises a protrusion, formed from the Ga—Al alloy and/or one or more other materials of clause 4, extending into the cavity, and wherein an end of the protrusion is positioned between the first side and the second side.
27. The article of any of clauses 21 through 26, wherein the electrode comprises a protrusion extending into the cavity, wherein an end of the protrusion is separated from the conductor.
28. The article of any of clauses 21 through 27, wherein the Ga—Al alloy comprises Ga and 30% by weight to 80% by weight of one or more of: an alloy of Al, 5% by weight of Ti, and 1% by weight of B, an alloy of Al, 3% by weight of Ti, and 1% by weight of B, or an alloy of Al, 3% by weight of Ti, and 0.15% by weight of C.
29. The article of any of clauses 21 through 28, wherein the activation temperature is between 60° C. and 120° C.
30. The article of any of clauses 21 through 29, further comprising a battery, an electrical load, a first electrical path between the battery and the electrical load, and a second electrical path between the electrical load and the battery, and wherein the first electrical path comprises the conductor, and the electrode is electrically connected to a portion of the first electrical path between the conductor and one of the battery and the electrical load, and is not electrically connected to any portion of the first electrical path between the other of the battery and the electrical load.
31. The article of any of clauses 21 through 30, further comprising an electrically-controllable heater positioned to raise a temperature of the activation block.
32. An article comprising an insulator comprising a first side, a second side, and a cavity extending from the first side to the second side.
33. The article of clause 32, further comprising an activation block located in the cavity and comprising a PCM configured to release, based on reaching an activation temperature, at least one of water or hydrogen peroxide.

34. The article of clause 32 or clause 33, further comprising an electrode attached to the first side and comprising a protrusion extending into the cavity, wherein at least the protrusion is formed from a Ga—Al alloy and/or from one or more other materials of clause 4, and wherein an end of the protrusion is positioned between the first side and the second side.
35. The article of any of clauses 32 through 34, further comprising a conductor located adjacent to the second side of the insulator.
36. The article of any of clauses 32 through 35, further comprising an adhesive located on the second side of the insulator; and a release paper covering the adhesive.
37. The article of any of clauses 32 through 36, wherein the insulator surrounds the electrode, and further comprising: a conductor surrounding the insulator.
38. The article of any of clauses 32 through 37, wherein the Ga—Al alloy comprises Ga and 30% by weight to 80% by weight of one or more of: an alloy of Al, 5% by weight of Ti, and 1% by weight of B, an alloy of Al, 3% by weight of Ti, and 1% by weight of B, or an alloy of Al, 3% by weight of Ti, and 0.15% by weight of C.
39. The article of any of clauses 32 through 38, wherein the activation temperature is between 60° C. and 120° C.
40. The article of any of clauses 32 through 39, further comprising a conductor separated from the electrode by the insulator; and a battery, an electrical load, a first electrical path between the battery and the electrical load, and a second electrical path between the electrical load and the battery, and wherein the first electrical path comprises the conductor, and the electrode is electrically connected to a portion of the first electrical path between the conductor and one of the battery and the electrical load, and is not electrically connected to any portion of the first electrical path between the other of the battery and the electrical load.
41. A method comprising placing a PCM between a portion of an electrode and a conductor, wherein the portion of the electrode is formed from a Ga—Al alloy and/or from one or more other materials of clause 4, and wherein the PCM is configured to release, based on reaching an activation temperature, one or more of water or hydrogen peroxide
42. The method of clause 41, further comprising applying a voltage across the portion of the electrode and the conductor while the PCM is heated to the activation temperature
43. The method of any of clauses 41 through 42, further comprising generating an electrochemical discharge plasma generated between the portion of the electrode and the conductor.
44. The method of any of clauses 41 through 43, further comprising penetrating the conductor with an electrochemical discharge plasma generated between the portion of the electrode and the conductor.
45. The method of any of clauses 41 through 44, wherein the activation temperature is between 60° C. and 120° C.
46. The method of any of clauses 41 through 45, wherein the Ga—Al alloy comprises Ga and 30% by weight to 80% by weight of one or more of: an alloy of Al, 5% by weight of Ti, and 1% by weight of B, an alloy of Al, 3% by weight of Ti, and 1% by weight of B, or an alloy of Al, 3% by weight of Ti, and 0.15% by weight of C.
47. The method of any of clauses 41 through 45, wherein the penetrating the conductor comprises severing the conductor and interrupting current flow through a circuit comprising the conductor.

The foregoing has been presented for purposes of example. The foregoing is not intended to be exhaustive or to limit features to the precise form disclosed. The examples discussed herein were chosen and described in order to explain principles and the nature of various examples and their practical application to enable one skilled in the art to use these and other implementations with various modifications as are suited to the particular use contemplated. The scope of this disclosure encompasses, but is not limited to, any and all combinations, subcombinations, and permutations of structure, operations, and/or other features described herein and in the accompanying drawing figures.

The invention claimed is:

1. An article comprising:
   a conductor;
   an electrode comprising a first portion, wherein at least the first portion is formed from a gallium-aluminum (Ga—Al) alloy; and
   an activation block located between the first portion of the electrode and the conductor, wherein the activation block comprises a phase change material configured to release, based on the activation block reaching an activation temperature, at least one of water or hydrogen peroxide.

2. The article of claim 1, further comprising an insulator located between the electrode and the conductor, wherein the insulator comprises a cavity, and wherein the activation block is located in the cavity.

3. The article of claim 2, wherein the insulator surrounds a portion of the electrode and the conductor surrounds the insulator.

4. The article of claim 2, wherein
   the cavity extends from a first side of the insulator to a second side of the insulator,
   the electrode is attached to the first side and comprises a protrusion, formed from the Ga—Al alloy, extending into the cavity, and
   an end of the protrusion is positioned between the first side and the second side.

5. The article of claim 2, wherein the electrode comprises a protrusion extending into the cavity, wherein an end of the protrusion is separated from the conductor.

6. The article of claim 1, wherein the Ga—Al alloy comprises gallium and 30% by weight to 80% by weight of one or more of:
   an alloy of aluminum, 5% by weight of titanium, and 1% by weight of boron,
   an alloy of aluminum, 3% by weight of titanium, and 1% by weight of boron, or
   an alloy of aluminum, 3% by weight of titanium, and 0.15% by weight of carbon.

7. The article of claim 1, wherein the activation temperature is between 60° Celsius and 120° Celsius.

8. The article of claim 1, further comprising:
   a battery, an electrical load, a first electrical path between the battery and the electrical load, and a second electrical path between the electrical load and the battery, and wherein
   the first electrical path comprises the conductor, and
   the electrode is electrically connected to a portion of the first electrical path between the conductor and one of the battery and the electrical load, and is not electrically connected to any portion of the first electrical path between the conductor and the other of the battery and the electrical load.

9. The article of claim 1, further comprising:
an electrically-controllable heater positioned to raise a temperature of the activation block.

10. An article comprising:
an insulator comprising a first side, a second side, and a cavity extending from the first side to the second side;
an activation block located in the cavity and comprising a phase change material configured to release, based on reaching an activation temperature, at least one of water or hydrogen peroxide; and
an electrode attached to the first side and comprising a protrusion extending into the cavity, wherein at least the protrusion is formed from a gallium-aluminum (Ga—Al) alloy, and wherein an end of the protrusion is positioned between the first side and the second side.

11. The article of claim 10, further comprising a conductor located adjacent to the second side of the insulator.

12. The article of claim 10, further comprising:
an adhesive located on the second side of the insulator; and
a release paper covering the adhesive.

13. The article of claim 10, wherein the insulator surrounds a portion of the electrode, and further comprising:
a conductor surrounding the insulator.

14. The article of claim 10, wherein the Ga—Al alloy comprises gallium and 30% by weight to 80% by weight of one or more of:
an alloy of aluminum, 5% by weight of titanium, and 1% by weight of boron,
an alloy of aluminum, 3% by weight of titanium, and 1% by weight of boron, or
an alloy of aluminum, 3% by weight of titanium, and 0.15% by weight of carbon.

15. The article of claim 10, wherein the activation temperature is between 60° Celsius and 120° Celsius.

16. The article of claim 10, further comprising:
a conductor separated from the electrode by the insulator; and
a battery, an electrical load, a first electrical path between the battery and the electrical load, and a second electrical path between the electrical load and the battery, and wherein
the first electrical path comprises the conductor, and
the electrode is electrically connected to a portion of the first electrical path between the conductor and one of the battery and the electrical load, and is not electrically connected to any portion of the first electrical path between the conductor and the other of the battery and the electrical load.

* * * * *

UNITED STATES PATENT AND TRADEMARK OFFICE
CERTIFICATE OF CORRECTION

PATENT NO. : 11,631,565 B2
APPLICATION NO. : 17/094577
DATED : April 18, 2023
INVENTOR(S) : Timler et al.

It is certified that error appears in the above-identified patent and that said Letters Patent is hereby corrected as shown below:

On the Title Page

Column 2, Other Publications, Line 2:
Delete "Al-Ga13 In-Sn" and insert --Al-Ga-In-Sn-- therefor Column 2, Other Publications, Line 3:
Delete "Additivies,"" and insert --Additives,"-- therefor Page 2, Column 2, Other Publications, Line 1:
Delete ""Fundaments" and insert --"Fundamentals-- therefor Page 2, Column 2, Other Publications, Line 12:
Delete "Tanoparticles" and insert --Nanoparticles-- therefor Page 2, Column 2, Other Publications, Line 16:
Delete "Tanoparticle" and insert --Nanoparticle-- therefor Page 2, Column 2, Other Publications, Line 26:
Delete "flexivel" and insert --flexible-- therefor Page 2, Column 2, Other Publications, Line 30:
Delete "vapor-asissted" and insert --vapor-assisted-- therefor Page 2, Column 2, Other Publications, Line 30:
Delete "Tanoparticle" and insert --Nanoparticle-- therefor Page 2, Column 2, Other Publications, Line 45:
Delete "Anetennas" and insert --Antennas-- therefor Signed and Sealed this
Twenty-sixth Day of March, 2024

*Katherine Kelly Vidal*

Katherine Kelly Vidal
*Director of the United States Patent and Trademark Office*

CERTIFICATE OF CORRECTION (continued)
U.S. Pat. No. 11,631,565 B2

Page 2, Column 2, Other Publications, Line 54:
Delete "Gallium-ndium" and insert --Gallium-Indium-- therefor Page 2, Column 2, Other Publications, Line 70:
Delete "Li2MgSi04" and insert --Li2MgSiO4-- therefor Page 3, Column 1, Other Publications, Line 15:
Delete "nterface" and insert --interface-- therefor